(12) United States Patent
Ma et al.

(10) Patent No.: US 11,966,576 B2
(45) Date of Patent: Apr. 23, 2024

(54) SCREEN ICON OPERATING METHOD AND APPARATUS

(71) Applicant: Huawei Technologies Co., Ltd., Shenzhen (CN)

(72) Inventors: Yuchi Ma, Shenzhen (CN); Bifeng Tong, Shenzhen (CN); Xiaohu Zhao, Nanjing (CN); Rigele Te, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 17 days.

(21) Appl. No.: 17/827,342

(22) Filed: May 27, 2022

(65) Prior Publication Data
US 2022/0283686 A1 Sep. 8, 2022

Related U.S. Application Data

(63) Continuation of application No. PCT/CN2020/127218, filed on Nov. 6, 2020.

(30) Foreign Application Priority Data

Nov. 28, 2019 (CN) .......................... 201911194640.X

(51) Int. Cl.
G06F 3/0488 (2022.01)
G06F 3/0484 (2022.01)

(52) U.S. Cl.
CPC .......... *G06F 3/0488* (2013.01); *G06F 3/0484* (2013.01)

(58) Field of Classification Search
CPC .. G06F 3/0488; G06F 3/0484; G06F 3/04817; G06F 3/0483; G06F 3/0485; G06F 3/04883; G06F 3/04886; G06F 3/04847
See application file for complete search history.

(56) References Cited

U.S. PATENT DOCUMENTS

| 2010/0023858 | A1* | 1/2010 | Ryu | G06F 3/0482 715/702 |
| 2014/0132524 | A1 | 5/2014 | Lee | |
| 2014/0282208 | A1* | 9/2014 | Chaudhri | G06F 3/04817 715/779 |
| 2015/0370425 | A1* | 12/2015 | Chen | G06F 3/04842 715/830 |

(Continued)

FOREIGN PATENT DOCUMENTS

| CN | 102609210 A | 7/2012 |
| CN | 103034450 A | 4/2013 |

(Continued)

*Primary Examiner* — Phuong H Nguyen
(74) *Attorney, Agent, or Firm* — Conley Rose, P.C.

(57) ABSTRACT

A screen icon operating method includes collecting user sliding operation information. The sliding operation information includes a first location, a sliding speed, pressing duration before sliding, or a sliding direction The first location is an initial location of a user sliding operation. When the first location is not located on an icon, when the sliding speed is less than a sliding speed threshold, moving icons on a display page by columns or by rows in the sliding direction, or when the first location is located on the icon, the method determines that the pressing duration is greater than or equal to a first duration threshold and less than or equal to a second duration threshold, and moves column icons or row icons in the sliding direction.

20 Claims, 26 Drawing Sheets

(56) References Cited

U.S. PATENT DOCUMENTS

2016/0349985 A1  12/2016  Ibaraki
2019/0073104 A1* 3/2019  Wang .................. G06F 3/04883

FOREIGN PATENT DOCUMENTS

| CN | 103324414 A | 9/2013 |
|---|---|---|
| CN | 103425394 A | 12/2013 |
| CN | 104516673 A | 4/2015 |
| EP | 2056215 A1 | 5/2009 |
| JP | 2016224523 A | 12/2016 |

* cited by examiner

SCREEN ICON OPERATING METHOD AND APPARATUS

CROSS-REFERENCE TO RELATED APPLICATIONS

This is a continuation of International Patent Application No. PCT/CN2020/127218 filed on Nov. 6, 2020, which claims priority to Chinese Patent Application No. 201911194640.X filed on Nov. 28, 2019. The disclosures of the aforementioned applications are hereby incorporated by reference in their entireties.

TECHNICAL FIELD

This disclosure relates to the field of electronic technologies, and in particular, to a method and an apparatus for conveniently operating icons on a screen of a smart device.

BACKGROUND

Nowadays, with popularization of smart devices, more people use devices with touchscreens, and it is common to perform operations on the touchscreens in daily scenarios. Generally, a user directly operates, with a finger or another input device, an icon displayed on the touchscreen, to perform an operation such as tapping or dragging. With popularization of smart devices with touchscreens, applications installed on the smart devices are also increasing dramatically. Therefore, it is very likely that the icon displayed on the touchscreen can be located across a plurality of desktops, and is tapped to perform a corresponding operation.

Icon operating on the smart device with the touchscreen is implemented in a very simple manner, that is, implemented through unified dragging by an input device. However, such an operation may have some disadvantages. For example, when a quantity of applications exceeds a range of controls that can be used on the touchscreen, the user needs to drag the entire screen once to find an icon that needs to be used. For example, some screens display 4×5 icons, that is, 20 icons, and some larger screens display 5×5 icons, that is, 25 icons. Consequently, the user needs to perform frequent dragging to find a corresponding icon. This causes very tedious operations and is very time-consuming.

SUMMARY

Embodiments of this disclosure provide a screen icon operating method, to determine whether an initial location of a user sliding operation is located on an icon, and further perform an entire screen operation or a single row/column operation. By performing the entire screen operation or the single row/column operation, frequent dragging caused by an excessive quantity of screen interfaces and one-hand operation difficulty caused by an excessively large screen are avoided. In addition, an idea of operating only an icon layout of the entire screen by performing dragging each time is changed, to greatly improve user operation experience and efficiency.

According to a first aspect, a touchscreen icon operating method. The method includes collecting user sliding operation information, where the user sliding operation information includes a first location, a sliding speed, pressing duration before sliding, or a sliding direction, and the first location is an initial location of a user sliding operation, and when the first location is not located on an icon, determining that the sliding speed is less than a sliding speed threshold, and moving all icons on a display page in the sliding direction, or when the first location is located on the icon, determining that the pressing duration is greater than or equal to a first duration threshold and less than or equal to a second duration threshold, and moving, in the sliding direction, column icons in a related column or row icons in a related row of the icon on which the first location is located on the display page.

In a possible implementation, the touch information further includes a second location, and the second location is a touch location at which the user sliding operation ends. Moving all icons on a display page in the sliding direction includes determining a sliding distance $\ell$ of the user sliding operation based on the first location and the second location, where $\ell$ is a projection distance of a straight-line distance between the second location and the first location in the sliding direction, determining a supplementary parameter N, where N is determined by dividing $\ell$ by a unit switching distance $\Delta h$, $\Delta h$ is greater than or equal to a width of a single icon and less than or equal to a width of an entire screen, and $\Delta h$ is an integer multiple of the width of the single icon, and moving all the icons on the display page by X rows or columns along the sliding direction, where X is a quantity of rows or columns of icons in an N×$\Delta h$ range, and X is an integer.

In a possible implementation, the sliding direction includes a horizontal direction and a vertical direction, the horizontal direction is parallel to a first edge of the touchscreen, the vertical direction is parallel to a second edge of the touchscreen, and the first edge is perpendicular to the second edge. The moving all the icons on the display page by X rows or columns along the sliding direction includes, if the sliding direction is the horizontal direction, moving all the icons on the display page by the X columns along the horizontal direction, or if the sliding direction is the vertical direction, cyclically moving all the icons on the display page by the X rows along the vertical direction.

In a possible implementation, if the sliding direction is the horizontal direction, the method further includes removing icons that fall outside the display page after the movement, determining, from an adjacent page in a direction opposite to the sliding direction, X columns of icons adjacent to the display page, and moving the icons to the display page.

In a possible implementation, if the sliding direction is the horizontal direction, the method further includes, when there are at least one column of icons on the adjacent page, and a quantity of columns of icons is less than X, determining a quantity Q of columns of icons on the adjacent page, where Q is a positive integer, and 0<Q<X, and moving all the icons on the display page by Q columns along the horizontal direction, removing icons that fall outside the display page after the movement, and moving the Q columns of icons on the adjacent page to the display page.

In a possible implementation, if the sliding direction is the horizontal direction, the method further includes, when there is no column of icons on the adjacent page, canceling the user sliding operation.

In a possible implementation, the first location includes two or more locations, and the method further includes determining, based on the two or more locations, that an area in which the first location is located on the display page includes at least two rows or at least two columns.

In a possible implementation, the touch information further includes a second location, and the second location is a touch location at which the user sliding operation ends. The sliding direction includes a horizontal direction and a vertical direction, the horizontal direction is parallel to a first edge of the touchscreen, the vertical direction is parallel to a second edge of the touchscreen, and the first edge is perpendicular to the second edge. Moving, in the sliding direction, column icons in a related column or row icons in a related row of the icon on which the first location is located on the display page includes determining a sliding distance $\ell$ of the user sliding operation based on the first location and the second location, where $\ell$ is a projection distance of a straight-line distance between the second location and the first location in the sliding direction, and when the sliding direction or a pressing force direction of the first location is the vertical direction, determining the related column of the icon on which the first location is located, and when $\ell$ of the user sliding operation is greater than a minimum sliding distance $\Delta\ell$, moving the column icons in the related column on the display page, or when the sliding direction or the pressing force direction of the first location is the horizontal direction, determining the related row of the icon on which the first location is located, and when $\ell$ of the user sliding operation is greater than $\Delta\ell$, moving the row icons in the related row on the display page.

In a possible implementation, moving the column icons in the related column on the display page includes cyclically moving the column icons in the related column.

In a possible implementation, the moving the row icons in the related row on the display page includes moving the row icons in the related row on the display page by Y icon distances along the horizontal direction, where Y is a quantity of icons in a $\ell$ distance range, and Y is an integer distance.

In a possible implementation, the method further includes removing icons that fall outside the display page after the movement, determining, from an adjacent page in a direction opposite to the sliding direction, Y icons that are located in a same row as the related row and that are adjacent to the display page, and moving the icons to the related row on the display page.

In a possible implementation, the method further includes, when there are icons in the same row as the related row on the adjacent page and a quantity of icons is less than Y, determining a quantity P of icons in the same row as the related row on the adjacent page, where P is a positive integer, and 0<P<Y, and moving all the icons in the related row on the display page by the P icons along the horizontal direction, removing icons that fall outside the display page after the movement, and moving the P icons in the same row as the related row on the adjacent page to the related row on the display page.

In a possible implementation, the method further includes, when there is no icon in the same row as the related row on the adjacent page, canceling the user sliding operation.

According to a second aspect, a touchscreen icon operating apparatus. The apparatus includes a sensor, a memory, a processor, and an interface circuit. The sensor is configured to collect user sliding operation information, where the user sliding operation information includes a first location, a sliding speed, pressing duration before sliding, or a sliding direction, and the first location is an initial location of a user sliding operation. The memory is configured to store code instructions and the user sliding operation information collected by the sensor. The interface circuit is configured to receive the code instructions and transmit the code instructions to the processor. The processor is configured to, when the first location is not located on an icon, determine that the sliding speed is less than a sliding speed threshold, and move all icons on a display page in the sliding direction, or when the first location is located on the icon, determine that the pressing duration is greater than or equal to a first duration threshold and less than or equal to a second duration threshold, and move, in the sliding direction, column icons in a related column or row icons in a related row of the icon on which the first location is located on the display page.

In a possible implementation, the touch information further includes a second location, and the second location is a touch location at which the user sliding operation ends. The processor is further configured to determine a sliding distance $\ell$ of the user sliding operation based on the first location and the second location, where $\ell$ is a projection distance of a straight-line distance between the second location and the first location in the sliding direction, and determine a supplementary parameter N, where N is determined by dividing $\ell$ by a unit switching distance $\Delta h$, $\Delta h$ is greater than or equal to a width of a single icon and less than or equal to a width of an entire screen, and $\Delta h$ is an integer multiple of the width of the single icon, and move all the icons on the display page by X rows or columns along the sliding direction, where X is a quantity of rows or columns of icons in an N×$\Delta h$ range, and X is an integer.

In a possible implementation, the sliding direction includes a horizontal direction and a vertical direction, the horizontal direction is parallel to a first edge of the touchscreen, the vertical direction is parallel to a second edge of the touchscreen, and the first edge is perpendicular to the second edge. The processor is further configured to, if the sliding direction is the horizontal direction, move all the icons on the display page by the X columns along the horizontal direction, or if the sliding direction is the vertical direction, cyclically move all the icons on the display page by the X rows along the vertical direction.

In a possible implementation, the processor is further configured to remove icons that fall outside the display page after the movement, determine, from an adjacent page in a direction opposite to the sliding direction, X columns of icons adjacent to the display page, and move the icons to the display page.

In a possible implementation, the processor is further configured to, when there are at least one column of icons on the adjacent page, and a quantity of columns of icons is less than X, determine a quantity Q of columns of icons on the adjacent page, where Q is a positive integer, and 0<Q<X, and move all the icons on the display page by Q columns along the horizontal direction, remove icons that fall outside the display page after the movement, and move the Q columns of icons on the adjacent page to the display page.

In a possible implementation, the processor is further configured to, when there is no column of icons on the adjacent page, cancel the user sliding operation.

In a possible implementation, the first location includes two or more locations. The processor is further configured to determine, based on the two or more locations, that an area in which the first location is located on the display page includes at least two rows or at least two columns.

In a possible implementation, the touch information further includes a second location, and the second location is a touch location at which the user sliding operation ends. The sliding direction includes a horizontal direction and a vertical direction, the horizontal direction is parallel to a first edge of the touchscreen, the vertical direction is parallel to a second edge of the touchscreen, and the first edge is perpendicular to the second edge. The processor is further configured to determine a sliding distance $\ell$ of the user sliding operation based on the first location and the second location, where $\ell$ is a projection distance of a straight-line distance between the second location and the first location in the sliding direction, and when the sliding direction or a pressing force direction of the first location is the vertical direction, determine the related column of the icon on which the first location is located, and when $\ell$ of the user sliding operation is greater than a minimum sliding distance $\Delta\ell$, move the column icons in the related column on the display page, or when the sliding direction or the pressing force direction of the first location is the horizontal direction, determine the related row of the icon on which the first location is located, and when $\ell$ of the user sliding operation is greater than M, move the row icons in the related row on the display page.

In a possible implementation, the processor is further configured to cyclically move the column icons in the related column.

In a possible implementation, the processor is further configured to move the row icons in the related row on the display page by Y icon distances along the horizontal direction, where Y is a quantity of icons in a $\ell$ distance range, and Y is an integer distance.

In a possible implementation, the processor is further configured to remove icons that fall outside the display page after the movement, determine, from an adjacent page in a direction opposite to the sliding direction, Y icons that are located in a same row as the related row and that are adjacent to the display page, and move the icons to the related row on the display page.

In a possible implementation, the processor is further configured to, when there are icons in the same row as the related row on the adjacent page and a quantity of icons is less than Y, determine a quantity P of icons in the same row as the related row on the adjacent page, where P is a positive integer, and 0<P<Y, and move all the icons in the related row on the display page by the P icons along the horizontal direction, remove icons that fall outside the display page after the movement, and move the P icons in the same row as the related row on the adjacent page to the related row on the display page.

In a possible implementation, the processor is further configured to, when there is no icon in the same row as the related row on the adjacent page, cancel the user sliding operation.

According to a third aspect, a touchscreen icon operating apparatus. The apparatus includes a collection module configured to collect user sliding operation information, where the user sliding operation information includes a first location, a sliding speed, pressing duration before sliding, or a sliding direction, and the first location is an initial location of a user sliding operation, and a processing module configured to, when the first location is not located on an icon, determine that the sliding speed is less than a sliding speed threshold, and move all icons on a display page in the sliding direction, or when the first location is located on the icon, determine that the pressing duration is greater than or equal to a first duration threshold and less than or equal to a second duration threshold, and move, in the sliding direction, column icons in a related column or row icons in a related row of the icon on which the first location is located on the display page.

In a possible implementation, the touch information further includes a second location, and the second location is a touch location at which the user sliding operation ends. The processing module is further configured to determine a sliding distance $\ell$ of the user sliding operation based on the first location and the second location, where $\ell$ is a projection distance of a straight-line distance between the second location and the first location in the sliding direction, and determine a supplementary parameter N, where N is determined by dividing $\ell$ by a unit switching distance $\Delta h$, $\Delta h$ is greater than or equal to a width of a single icon and less than or equal to a width of an entire screen, and $\Delta h$ is an integer multiple of the width of the single icon, and move all the icons on the display page by X rows or columns along the sliding direction, where X is a quantity of rows or columns of icons in an N×$\Delta h$ range, and X is an integer.

In a possible implementation, the sliding direction includes a horizontal direction and a vertical direction, the horizontal direction is parallel to a first edge of the touchscreen, the vertical direction is parallel to a second edge of the touchscreen, and the first edge is perpendicular to the second edge. The processing module is further configured to, if the sliding direction is the horizontal direction, move all the icons on the display page by the X columns along the horizontal direction, or if the sliding direction is the vertical direction, cyclically move all the icons on the display page by the X rows along the vertical direction.

In a possible implementation, the processing module is further configured to remove icons that fall outside the display page after the movement, determine, from an adjacent page in a direction opposite to the sliding direction, X columns of icons adjacent to the display page, and move the icons to the display page.

In a possible implementation, the processing module is further configured to, when there are at least one column of icons on the adjacent page, and a quantity of columns of icons is less than X, determine a quantity Q of columns of icons on the adjacent page, where Q is a positive integer, and 0<Q<X, and move all the icons on the display page by Q columns along the horizontal direction, remove icons that fall outside the display page after the movement, and move the Q columns of icons on the adjacent page to the display page.

In a possible implementation, the processing module is further configured to, when there is no column of icons on the adjacent page, cancel the user sliding operation.

In a possible implementation, the first location includes two or more locations. The processing module is further configured to determine, based on the two or more locations, that an area in which the first location is located on the display page includes at least two rows or at least two columns.

In a possible implementation, the touch information further includes a second location, and the second location is a touch location at which the user sliding operation ends. The sliding direction includes a horizontal direction and a vertical direction, the horizontal direction is parallel to a first edge of the touchscreen, the vertical direction is parallel to a second edge of the touchscreen, and the first edge is perpendicular to the second edge. The processing module is further configured to determine a sliding distance $\ell$ of the user sliding operation based on the first location and the second location, where $\ell$ is a projection distance of a straight-line distance between the second location and the first location in the sliding direction, and when the sliding direction or a pressing force direction of the first location is the vertical direction, determine the related column of the icon on which the first location is located, and when $\ell$ of the user sliding operation is greater than a minimum sliding distance $\Delta\ell$, move the column icons in the related column on the display page, or when the sliding direction or the pressing force direction of the first location is the horizontal direction, determine the related row of the icon on which the first location is located, and when $\ell$ of the user sliding operation is greater than $\Delta\ell$, move the row icons in the related row on the display page.

In a possible implementation, the processing module is further configured to cyclically move the column icons in the related column.

In a possible implementation, the processing module is further configured to move the row icons in the related row on the display page by Y icon distances, where Y is a quantity of icons in a $\ell$ distance range, and Y is an integer distance.

In a possible implementation, the processing module is further configured to remove icons that fall outside the display page after the movement, determine, from an adjacent page in a direction opposite to the sliding direction, Y icons that are located in a same row as the related row and that are adjacent to the display page, and move the icons to the related row on the display page.

In a possible implementation, the processing module is further configured to, when there are icons in the same row as the related row on the adjacent page and a quantity of icons is less than Y, determine a quantity P of icons in the same row as the related row on the adjacent page, where P is a positive integer, and 0<P<Y, and move all the icons in the related row on the display page by the P icons along the horizontal direction, remove icons that fall outside the display page after the movement, and move the P icons in the same row as the related row on the adjacent page to the related row on the display page.

In a possible implementation, the processing module is further configured to, when there is no icon in the same row as the related row on the adjacent page, cancel the user sliding operation.

According to a fourth aspect, a computer-readable storage medium storing a program is provided. The program includes instructions, and when the instructions are executed by a computer, the computer is enabled to perform the method in the first aspect.

According to a fifth aspect, a computer program product including instructions is provided. When the computer program product is run, the method in the first aspect is performed.

This disclosure discloses a screen icon operating method and apparatus, to determine, by using collected touch information, whether a current user sliding operation is an entire screen operation or a row/column icon operation. For the entire screen operation, a conventional operation may be excluded based on a sliding speed, and entire-screen icon movement is performed based on the touch information. For the row/column icon operation, a conventional operation may be excluded based on pressing duration, and row or column icon movement may be performed in a sliding direction. In the foregoing manner, a corresponding icon can be quickly found. In addition, when an input device is a finger, for a large-screen terminal device whose size exceeds a specific size, operations can be quickly implemented with one hand. Therefore, the operations are simpler and more convenient, and user operation experience is improved.

DESCRIPTION OF EMBODIMENTS

The following describes the technical solutions in embodiments of this disclosure with reference to accompanying drawings in embodiments of this disclosure.

Figure 1:
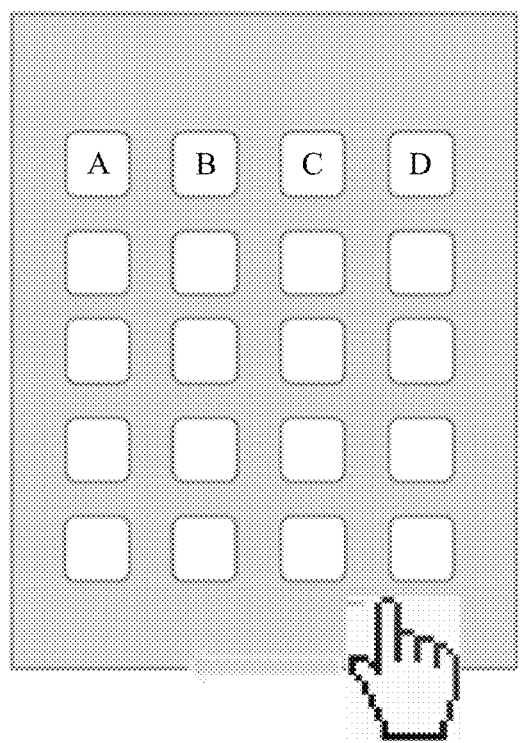
FIG. 1 is a schematic diagram of icon sliding of a smart device according to an embodiment of this disclosure.

This disclosure is applied to a scenario in which a user performs a screen icon operation on a terminal device. In this disclosure, the terminal device is a smart device with a touchscreen. In this scenario, there are usually many application icons on a desktop, and not all application icons are displayed on a current display interface. In this case, when a user wants to find an application to perform an operation, as shown in FIG. 1, the user needs to slide along the screen to switch to another display interface, and find a corresponding application to perform an operation. If a location of a target application is separated from the current display interface by several interfaces, the user needs to cross a plurality of interfaces to find the target application. This causes very cumbersome user operations.

In addition, for a terminal device with a large screen, it is assumed that the user performs a screen operation with two hands. In this case, when a size of the screen exceeds a specific length, it is very difficult for the user to perform an operation with one hand.

For the foregoing problem, in this disclosure, it is determined, based on a start location of a user sliding operation, to perform an entire-screen icon operation or a single-row or single-column icon operation. For the entire-screen icon operation, when a sliding speed is less than a specific threshold, entire-screen page icon movement is performed. For the single-row or single-column icon operation, when pressing duration reaches a specific duration range, row or column icon movement may be performed in a sliding direction. Through the foregoing operations, when performing a screen operation, the user can perform icon movement more quickly, to find the target application. In addition, for a screen whose size exceeds a specific size, when the user chooses to perform a screen operation by hand, it can be more convenient for the user to perform the screen operation with one hand. This improves user experience.

The following describes in detail the technical solutions in embodiments of this disclosure with reference to the accompanying drawings in embodiments of this disclosure.

Figure 2:
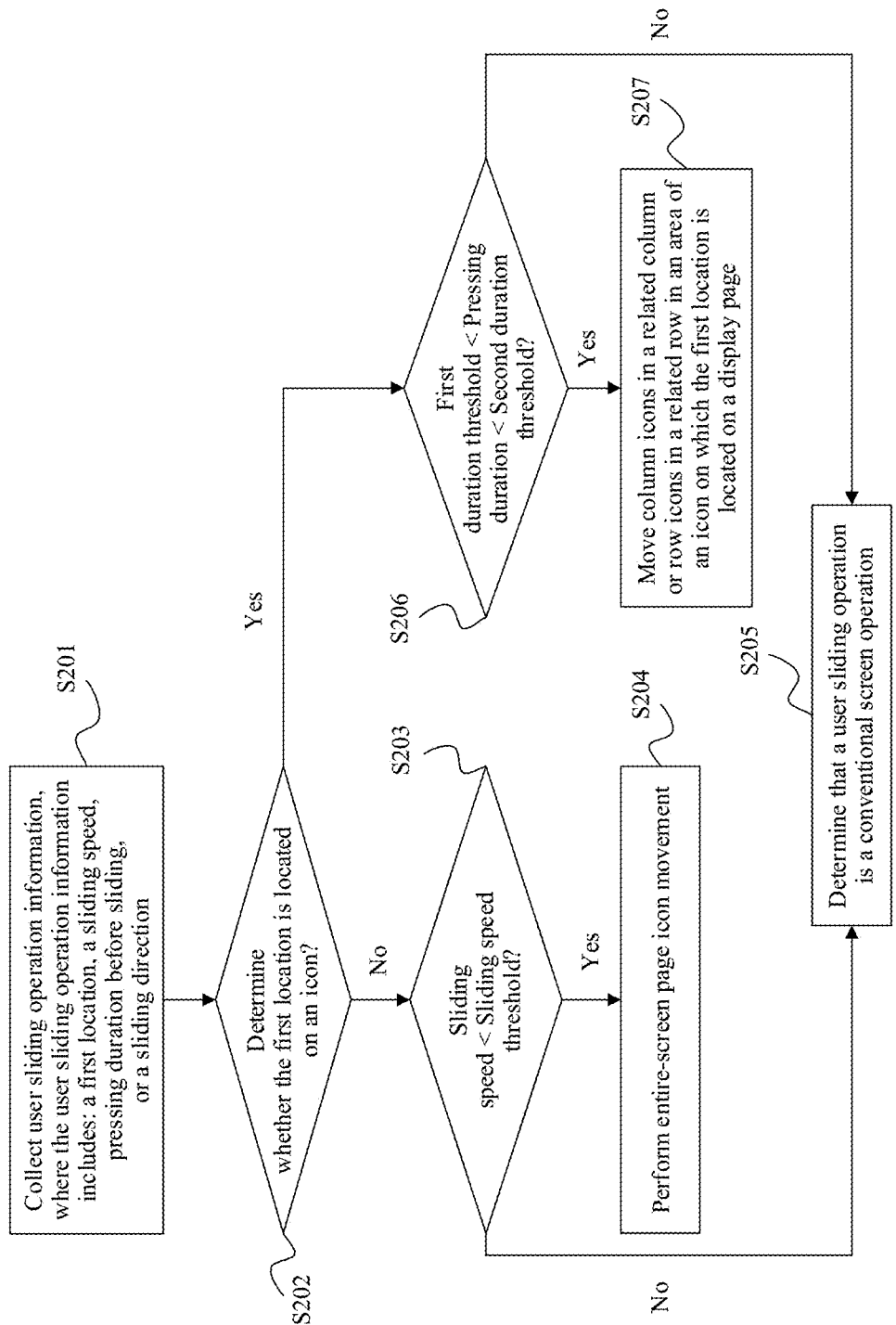
FIG. 2 is a flowchart of a screen icon operating method according to an embodiment of this disclosure.

FIG. 2 is a flowchart of a screen icon operating method according to an embodiment of this disclosure.

FIG. 2 provides a screen icon operating method. The method may be applied to a terminal device. A person skilled in the art should know that the terminal device in this disclosure may be any terminal device with a touchscreen, such as a mobile phone, a computer, a tablet, or a wearable device. This is not limited in this disclosure.

The method may include the following steps.

S201: Collect user sliding operation information, where the sliding operation information includes a first location, a sliding speed, pressing duration before sliding, or a sliding direction, and the first location is an initial location of a user sliding operation.

In an embodiment, the terminal device first collects touch information of the user sliding operation performed by a user on the touchscreen of the terminal device. The touch information may include the initial location of the current user sliding operation, that is, the first location. The touch information may further include the sliding speed of the current user sliding operation, the pressing duration at the first location before the sliding, or the sliding direction.

In an example, the user sliding operation in this disclosure may include the following several operations: tapping or moving with one finger, tapping or moving with one knuckle, tapping or moving with a plurality of fingers, tapping or moving with a plurality of knuckles, and a user-defined gesture. The user-defined gesture is a gesture that can be identified by a system running on the terminal device, for example, drawing a circle or drawing a line. In addition, the user-defined gesture is usually characterized by "identifiable" and "not repeated with other gestures". It may be understood that the user-defined gesture is different from any other gesture preset on the terminal device, to avoid a conflict caused by a same gesture. The preset gesture may be preset in the system, or may be set by the user. In addition, the user-defined gesture is usually not particularly complex. Certainly, it may be understood that, in some special cases, the user-defined gesture may alternatively be a complex gesture.

Figure 3:
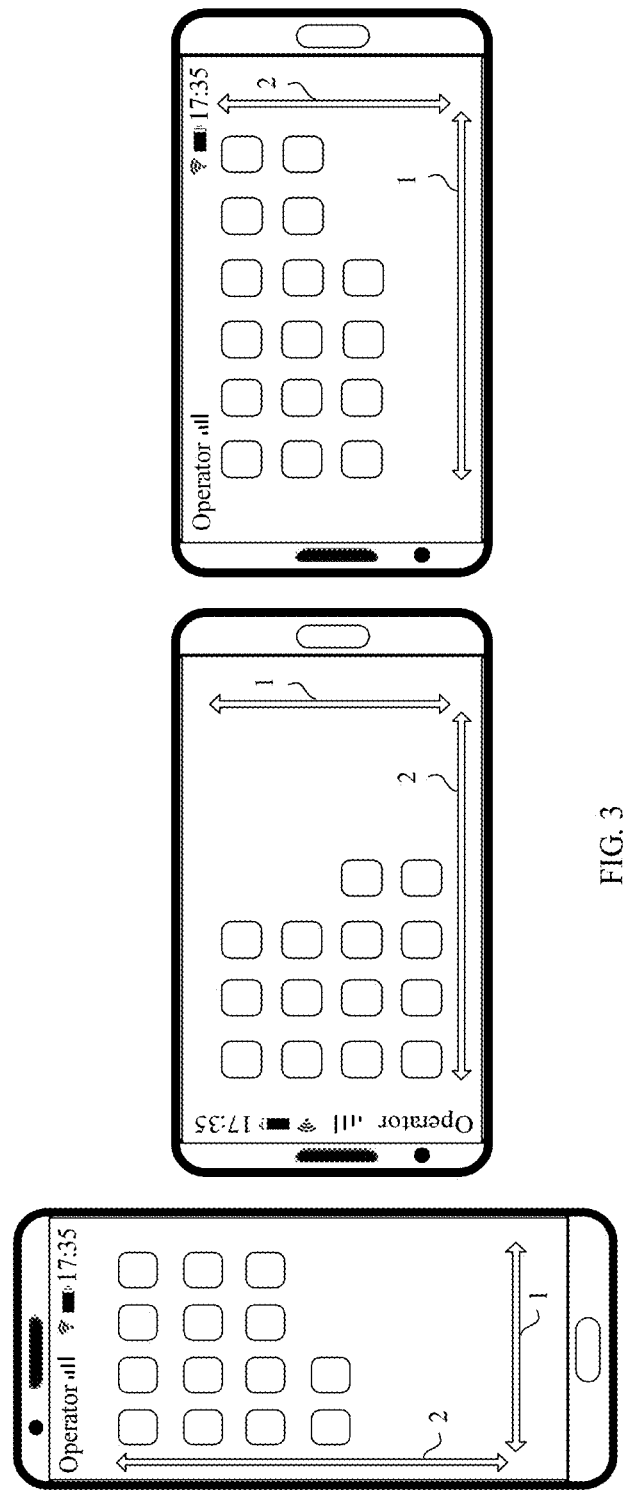
FIG. 3 is a schematic diagram of a sliding direction of screen icon operating according to an embodiment of this disclosure.

In another example, the sliding direction may include a horizontal direction and a vertical direction. The horizontal direction is a horizontal direction of an operation interface currently displayed by the terminal device, and the vertical direction is a vertical direction of the operation interface currently displayed by the terminal device. For example, as shown in FIG. 3, a direction pointed by a double-headed arrow 1 is a horizontal direction, and a direction pointed by a double-headed arrow 2 is a vertical direction. A relationship between a horizontal direction and a vertical direction of a current screen and a display page of a terminal device in different states can be clearly seen from FIG. 3.

S202: Determine whether the first location is located on an icon.

In an embodiment, the terminal device needs to determine whether the first location of the current user sliding operation is located on the icon. When the first location is not located on the icon, the terminal device determines that the current user sliding operation is an entire screen operation, and performs S203. Alternatively, when the first location is located on the icon, the terminal device determines that the current user sliding operation is an icon operation, and performs S206.

In an example, the terminal device needs to first distinguish the current user sliding operation from a conventional screen operation. When the user needs to perform an operation on the touchscreen of the terminal device, the user usually makes a continuous and non-stop gesture. For example, the user quickly slides along an area on the screen other than the icon with a finger, to implement screen sliding. Alternatively, the user taps the icon to enter an application represented by the icon. Alternatively, when the user touches and holds the icon for specific duration, the user drags or rearranges the icon, and performs a further operation.

The user sliding operation in this disclosure is different from the foregoing conventional screen operation. To help distinguish the user sliding operation in this disclosure from the conventional screen operation, this disclosure further includes the following steps.

S203: Determine whether the sliding speed is less than a sliding speed threshold.

In an embodiment, the terminal device determines whether the sliding speed of the current user sliding operation is less than the sliding speed threshold. The sliding speed threshold may be preset. When the sliding speed is greater than or equal to the sliding speed threshold, the terminal device performs S205. In embodiments of this disclosure, it is determined whether the sliding speed is less than the sliding speed threshold, and when the sliding speed does not reach the sliding speed threshold, S204 is performed.

S204: Perform entire-screen page icon movement.

In an embodiment, it is determined that the current user sliding operation is not a conventional screen operation, and entire-screen page icon movement is performed based on the current user sliding operation.

S205: Determine that the user sliding operation is a conventional screen operation.

In an embodiment, it is determined that the current user sliding operation is a conventional screen operation, and the operation may be, for example, sliding to switch a display interface of the current screen as a whole.

S206: Determine whether the pressing duration is between a first duration threshold and a second duration threshold.

In an embodiment, after the terminal device determines that the start location of the current user sliding operation is located on the icon, it may be understood that the current user sliding operation is tapping an application icon displayed on the screen. In this case, if the user does not immediately end the user sliding operation, but presses the first location for specific duration, the terminal device determines the pressing duration of the current user sliding operation, and determines whether the pressing duration is between the first duration threshold and the second duration threshold. In an example, the first duration threshold is set to determine whether the current user sliding operation is tapping to enter the application. When the pressing duration is less than or equal to the first duration threshold, the current user sliding operation is a conventional operation such as tapping to enter the application. When the pressing duration is greater than the first duration threshold, the current user sliding operation is not tapping to enter the application. In another example, the second duration threshold is set to determine whether the current user sliding operation is an operation of dragging or rearranging an icon. When the pressing duration is greater than or equal to the second duration threshold, the current user sliding operation is an operation of dragging or rearranging an icon, and another conventional operation such as dragging the icon to any location, rearranging the icon, or triggering a deletion operation may be performed. When the pressing duration is less than the second duration threshold, the current user sliding operation is not an operation of dragging or rearranging an icon.

In this disclosure, it is determined whether the pressing duration is between the first duration threshold and the second duration threshold, to distinguish the current user sliding operation from a conventional screen operation, to perform S207.

In another example, when it is determined that the current user sliding operation is a conventional screen operation, S205 is performed to perform the conventional screen operation. The operation may alternatively be, for example, tapping an icon to enter an application, or dragging a tapped icon.

S207: Move column icons in a related column or row icons in a related row in an area of an icon on which the first location is located on a display page.

In an embodiment, it is determined that the current user sliding operation is not a conventional screen operation, and the column icons in the related column or the row icons in the related row in the area of the icon on which the first location is located on the display page are moved in a sliding direction of the current user sliding operation after pressing and sliding.

This disclosure discloses a screen icon operating method and apparatus, to determine, by using collected touch information, whether a current user sliding operation is an entire screen operation or a row/column icon operation. For the entire screen operation, a conventional operation may be excluded based on a sliding speed, and entire-screen icon movement is performed based on the touch information. For the row/column icon operation, a conventional operation may be excluded based on pressing duration, and row or column icon movement may be performed in a sliding direction. In the foregoing manner, a corresponding icon can be quickly found. In addition, when an input device is a finger, for a large-screen terminal device whose size exceeds a specific size, operations can be quickly implemented with one hand. Therefore, the operations are simpler and more convenient, and user operation experience is improved.

Figure 4:
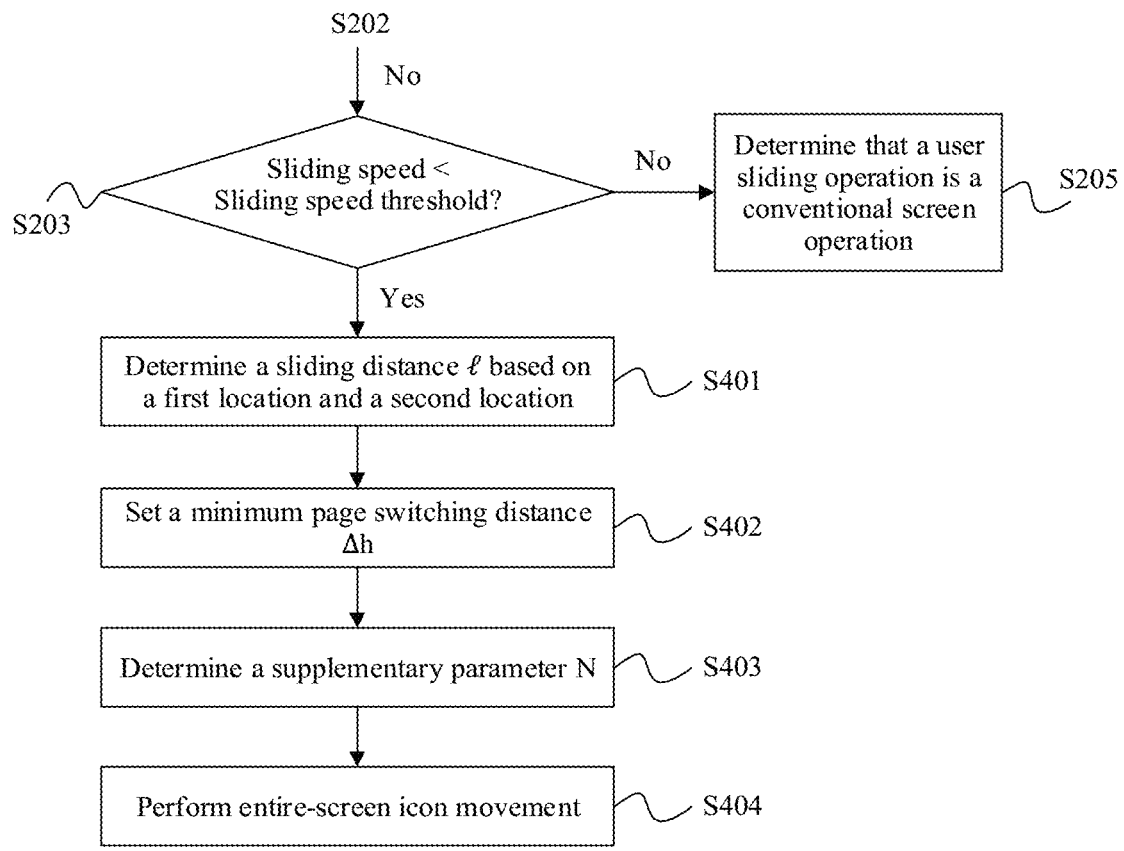
FIG. 4 is a flowchart of another screen icon operating method according to an embodiment of this disclosure.

FIG. 4 is a flowchart of another screen icon operating method according to an embodiment of this disclosure.

FIG. 4 shows an entire screen operation that is performed after the first area is determined as an area other than the area in which the icon is located in S202 shown in FIG. 2. After S202, the method may include the following steps.

S203: Determine whether the sliding speed is less than a sliding speed threshold.

In an embodiment, when determining that the sliding speed is greater than or equal to the sliding speed threshold, the terminal device performs S205.

S205: Determine that the user sliding operation is a conventional screen operation.

S203 and S205 shown in FIG. 4 are same steps as S203 and S205 shown in FIG. 2. For ease of description, details are not described herein again. When the sliding speed does not reach the sliding speed threshold, FIG. 4 shows a more detailed execution process of S204, which may include the following steps.

S401: Determine a sliding distance $\ell$ of the user sliding operation based on the first location and a second location.

In an embodiment, the touch information may further include a second location. The second location is a touch location at which the user sliding operation ends. The sliding distance $\ell$ of the current user sliding operation is determined based on the first location and the second location. $\ell$ represents a projection distance of a straight-line distance between the first location and the second location in the sliding direction. In an example, considering that one user sliding operation of the user is probably not performed only in the horizontal direction or the vertical direction, a longer one of projection distances of the sliding distance $\ell$ in the horizontal direction and the vertical direction is determined, and the sliding direction is determined as the direction with the longer projection distance. Then, the sliding distance in the other direction may be ignored. Therefore, only a sliding distance in a direction may be considered. Certainly, a person skilled in the art should know that, in another example, sliding distances in both a horizontal direction and a vertical direction may alternatively be considered. This is not limited herein in this disclosure.

S402: Set a minimum page switching distance $\Delta h$.

Figure 5:
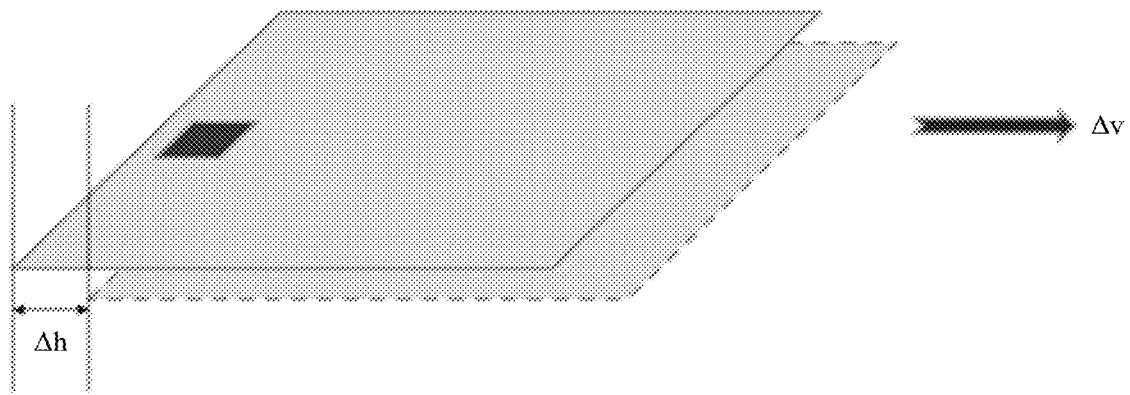
FIG. 5 is a schematic diagram of one type of screen movement according to an embodiment of this disclosure.

In an embodiment, the minimum page switching distance $\Delta h$ may be preset. In an example, a minimum value of $\Delta h$ is not less than a width of a column of icons, and a maximum width of $\Delta h$ is not greater than a width of an entire screen. In another example, $\Delta h$ may be an integer multiple of a width of a column of icons. This facilitates subsequent icon movement operations. In still another example, if a length of $\ell$ is less than $\Delta h$, the current user sliding operation may be canceled. FIG. 5 is a schematic diagram of one type of screen movement according to an embodiment of this disclosure. As shown in FIG. 5, the sliding speed is less than the sliding speed threshold $\Delta v$ when the sliding direction is rightward sliding. In this case, the minimum page switching distance $\Delta h$ is set. It can be learned that a width of $\Delta h$ in FIG. 5 may be set to a width of a column of icons. For a user sliding operation performed when the movement distance is less than $\Delta h$, the terminal device may ignore the current user sliding operation, and reset the screen. When the sliding distance exceeds $\Delta h$, the terminal device performs S403.

S403: Determine a supplementary parameter N.

In an embodiment, the supplementary parameter N may be determined, and is used to supplement the screen after the sliding, and a location of each icon on the screen after the supplementation is determined. In an example, the supplementary parameter N may be determined by dividing $\ell$ by $\Delta h$. In another example, N is rounded off.

In another embodiment, icons in an N×$\Delta h$ range arranged on an edge of the screen in the sliding direction are removed from the display page, and icons on the display page are supplemented with. In an example, when the sliding direction is leftward sliding, icons on the left of the current screen are removed from the display page, and there are vacant locations if the right of the current screen is not supplemented. In this case, vacant icon locations are determined in an N×$\Delta h$ range on the right of the screen. A person skilled in the art should know that, when the sliding direction is rightward sliding, a similar method is used, and a difference lies in an opposite direction. Details are not described herein.

In another example, when the sliding direction is upward sliding, icons on the top of the current screen are removed from the display page, and there are vacant locations if the bottom of the current screen is not supplemented. In this case, vacant icon locations are determined in an N×$\Delta h$ range on the bottom of the screen. A person skilled in the art should know that, when the sliding direction is downward sliding, a similar method is used, and a difference lies in an opposite direction. Details are not described herein.

S404: Perform entire-screen icon movement.

In an embodiment, if the sliding direction is the horizontal direction, all icons on the display page are moved by X columns along the horizontal direction.

In an example, X columns of icons in a range of the first N $\Delta h$ along the sliding direction on the display page may be removed from the display page, and then the remaining columns of icons on the display page are moved by N $\Delta h$ along the sliding direction. In this case, there are vacant locations if no icon is supplemented with in the range of the first N $\Delta h$ in a direction opposite to the sliding direction on the display page. The terminal device determines to display the first X columns of icons arranged in the sliding direction on an adjacent page of the display page in a direction opposite to the sliding direction. Herein, X is an integer. In addition, the first X columns of icons arranged along the sliding direction on the adjacent page are moved to vacant locations on the display page, to implement entire-screen icon movement. For example, after the user leftward slides along the display page by two columns, the first two columns on the left of the display page are removed from the display page, and two leftmost columns of icons on the adjacent page on the right of the display page are moved in from the right of the display page to implement supplementation.

A person skilled in the art should know that, in a specific implementation process, the foregoing vacant locations are not displayed on the display page, but a corresponding column of icons are directly removed from the display page, and icons on the adjacent page are moved to the display page to implement supplementation.

In an example, icon locations on the screen are fixed. Icons that remain after the user sliding operation ends are translated along the sliding direction and displayed at corresponding icon locations, and icons that are removed from the screen after the user sliding operation ends are not displayed. For icon locations that are supplemented with after the movement, icons on the adjacent page of the display page in a direction opposite to the sliding direction need to be determined, and the icons on the adjacent page of the display page are moved to the display page. For example, when the sliding direction is leftward sliding, icons on the right adjacent interface are determined, and then corresponding icons on the left of the display page are removed from the current interface, and the corresponding icons on the adjacent page are moved to the display page for display. When the sliding direction is rightward sliding, a similar operation is performed, and a difference lies in an opposite direction. Details are not described herein.

In another embodiment, if the sliding direction is the vertical direction, all the icons on the display page are cyclically moved by X rows along the vertical direction.

In an example, X rows of icons in a range of the first N $\Delta h$ along the sliding direction on the display page may be removed from the display page, and then the remaining rows of icons on the display page are moved by N $\Delta h$ along the sliding direction. In this case, there are vacant locations if no icon is supplemented with in the range of the first N $\Delta h$ in a direction opposite to the sliding direction on the display page. The terminal device moves, back to the display page along a direction opposite to the sliding direction of the display page, the X rows of icons that are removed from the display page, to perform supplementation, so as to implement cyclic entire-screen icon movement in the vertical direction. For example, after the user upward slides along the display page by two rows, the top two rows are removed from the display page, and moves the two rows back to the display page from the bottom of the display page, to implement cyclic icon supplementation in the vertical direction.

A person skilled in the art should know that, in a specific implementation process, the foregoing vacant locations are not displayed on the display page, but a corresponding column of icons are directly removed from the display page, and icons on the adjacent page are moved to the display page to implement supplementation.

In an example, icon locations on the screen are fixed. Icons that remain after the user sliding operation ends are translated along the sliding direction and displayed at corresponding icon locations, and icons that are removed from the screen after the user sliding operation ends are moved to the display page in a direction opposite to the sliding direction of the current screen for display. For example, when the sliding direction is upward sliding, icons that fall outside the page are moved back to the page from the bottom for display. When the sliding direction is downward sliding, a similar operation is performed, and a difference lies in an opposite direction. Details are not described herein.

In another embodiment, when the sliding direction is the horizontal direction, a quantity of columns of icons on the adjacent page of the display page in a direction opposite to the sliding direction may be further determined. When there is at least one column of icons on the adjacent page, and a quantity of columns of icons on the adjacent page of the display page are insufficient to supplement vacant locations on the display page, a quantity Q of columns of icons on the adjacent page is determined. Herein, Q is a positive integer, and 0<Q<X. Then, all the icons on the display page are moved by Q columns along the horizontal direction, icons that fall outside the display page after the movement are removed, and the Q columns of icons on the adjacent page are moved to the display page.

In an example, the first Q columns of icons on the display page along the sliding direction may be removed from the display page, and the remaining columns of icons on the display page are moved to the top along the sliding direction. Then, the Q column of icons arranged along the sliding direction on the adjacent page are moved to the display page. A person skilled in the art should know that, if the quantity Q of columns of icons on the adjacent page is greater than or equal to 1 and less than X, the Q columns of icons instead of X columns of icons are removed from the display page along the sliding direction. Then, the Q columns of icons on the adjacent page are moved to the display page for supplementation. For example, after the user leftward slides along the display page by two columns, if there are only one column of icons on the adjacent page on the right of the display page, only one leftmost column of icons on the display page are removed, and one column of icons on the adjacent page are moved from the right of the display page for supplementation.

In still another embodiment, when the sliding direction is the horizontal direction, if there is no icon on the adjacent page, that is, Q is 0, the terminal device may cancel the current user sliding operation.

It may be understood that the terminal device in this disclosure may perform, based on a quantity of columns of icons on the adjacent page, adaptive supplementation when the quantity of columns of icons on the adjacent page of the display page in a direction opposite to the sliding direction are insufficient to supplement vacant locations on the display page. For example, when two columns of icons need to be supplemented with, and there is only one column of icons on the adjacent page, only one column of icons are moved and supplemented with on the display page. A user sliding operation that is performed with no icon existing on the adjacent page may be ignored.

A person skilled in the art should know that, when entire screen movement is performed, if vacant locations originally exist on the display page, icons are not fully arranged. In a case of horizontal movement, if icons exist on the adjacent page, vacant locations originally existing on the display page also move along a movement direction in a movement process. Existing vacant locations are not supplemented with icons moved to the display page. In a case of vertical movement, existing vacant locations are not supplemented with icons cyclically moved to the display page.

In still another embodiment, after the user sliding operation ends, an icon distribution status on the current screen may be further presented by using the screen of the terminal device. In an example, screen icons that are finally presented are aligned and not misplaced.

Figure 6:
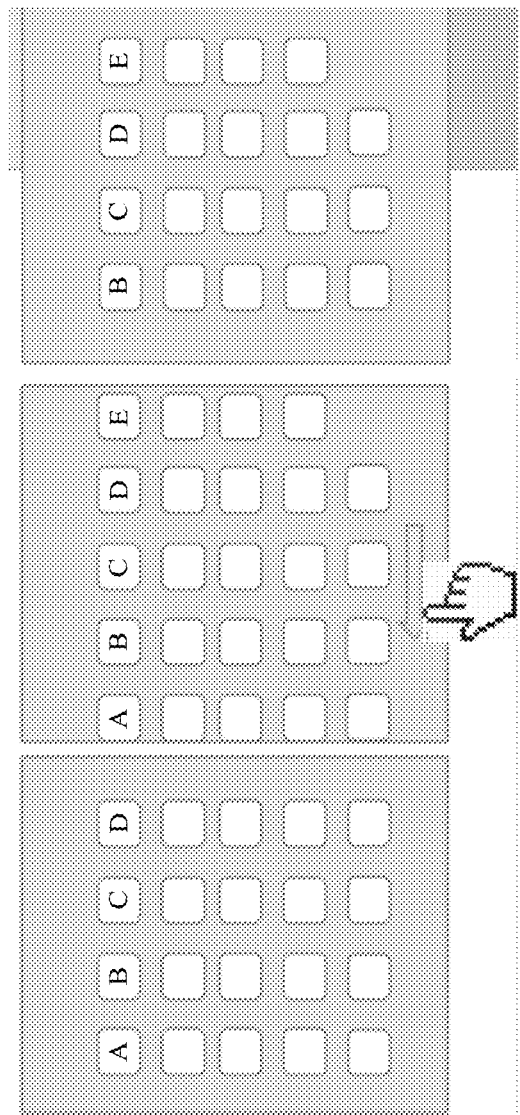
FIG. 6 is a schematic diagram of one type of screen display of screen icon operating according to an embodiment of this disclosure.

FIG. 6 is a schematic diagram of one type of screen display of screen icon operating according to an embodiment of this disclosure.

FIG. 6 is a more intuitive schematic diagram of screen display in the methods shown in FIG. 4 and FIG. 5. It can be clearly seen from FIG. 6 that original screen display icons are column A, column B, column C, and column D. When the user slides along the screen with a finger, in a sliding direction, for example, leftward sliding shown in FIG. 6, icons in column E on a next interface are supplemented with according to the methods in FIG. 4 and FIG. 5. After the sliding, original column B, column C, and column D on the rightmost interface in FIG. 6 are translated leftward together, the icons in column E on the next interface are supplemented with, and screen display icons are finally updated to column B, column C, column D, and column E.

Figure 7:
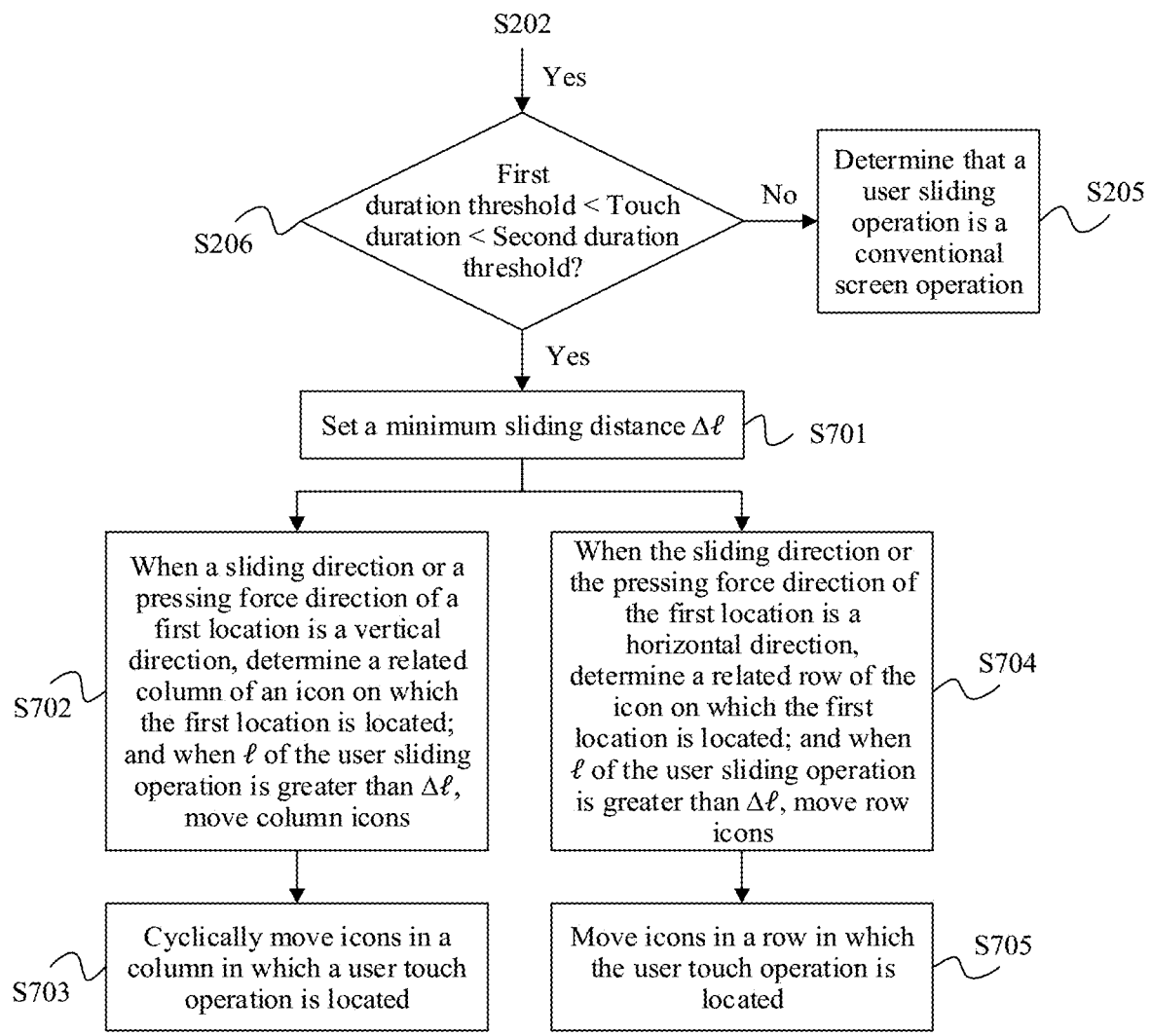
FIG. 7 is a flowchart of still another screen icon operating method according to an embodiment of this disclosure.

FIG. 7 is a flowchart of still another screen icon operating method according to an embodiment of this disclosure.

FIG. 7 shows an icon operation that is performed after the first area is determined as the area in which the icon is located in S202 shown in FIG. 2. After S202, the method may include the following step.

S206: Determine whether the pressing duration is between a first duration threshold and a second duration threshold.

In an embodiment, when determining that the pressing duration is less than or equal to the first duration threshold or greater than or equal to the second duration threshold, the terminal device determines that the current user sliding operation is a conventional operation, and performs S205.

S205: Determine that the user sliding operation is a conventional screen operation.

S206 and S205 shown in FIG. 7 are same steps as S203 and S205 shown in FIG. 2. For ease of description, details are not described herein again. When the pressing duration is greater than the first duration threshold and less than the second duration threshold, FIG. 7 shows a more detailed execution process of S207, which may include the following steps.

S701: Set a minimum sliding distance $\Delta \ell$.

In an embodiment, the touch information further includes a second location. The second location is a touch location at which the user sliding operation ends. A sliding distance $\ell$ of the current user sliding operation is determined based on the first location and the second location. $\ell$ represents a projection distance of a straight-line distance between the first location and the second location in the sliding direction. In another embodiment, the minimum sliding distance $\Delta \ell$ may be further preset, to avoid some operations caused by accidental touch or accidental trigger by the user.

In an example, $\Delta \ell$ may be set as a length of 10 pixels. If $\ell \leq \Delta \ell$, the terminal device may consider that the current operation is accidental touch or accidental trigger, and ignore the current user sliding operation.

Figure 8:
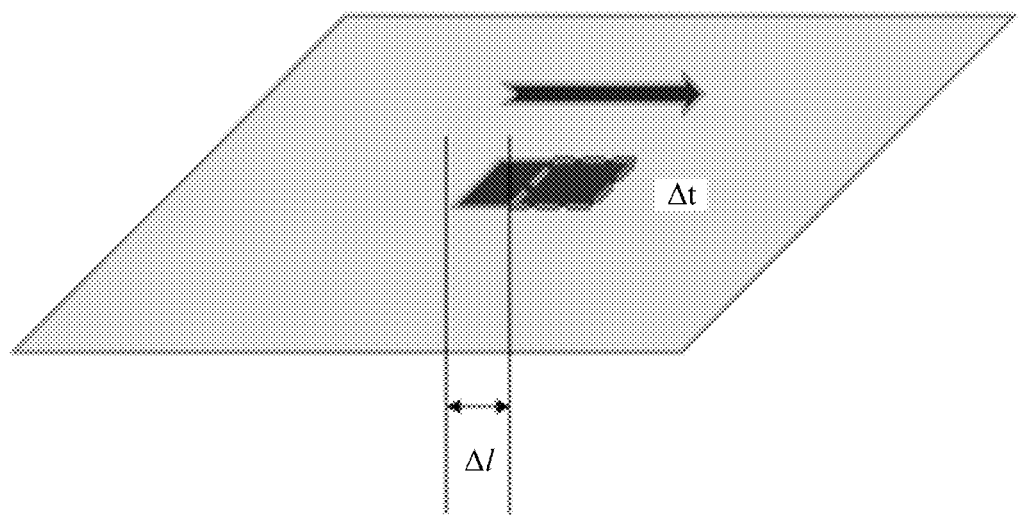
FIG. 8 is a schematic diagram of another type of screen movement according to an embodiment of this disclosure.

In another example, FIG. 8 is a schematic diagram of another type of screen movement according to an embodiment of this disclosure. As shown in FIG. 8, when the user sliding operation is located on an icon, if the pressing duration $\Delta t$ is between the first duration threshold and the second duration threshold, a relationship between the sliding distance $\ell$ and $\Delta\ell$ is determined.

S702: When the sliding direction or a pressing force direction of the first location is the vertical direction, determine the related column of the icon on which the first location is located, and when $\ell$ of the user sliding operation is greater than $\Delta\ell$, move the column icons.

In an embodiment, when determining that the sliding direction or the pressing force direction of the first location is the vertical direction, the terminal device may determine the related column of the icon on which the first location is located. Then, when $\ell$ is greater than $\Delta\ell$, the terminal device determines that the current user sliding operation is a column icon operation, and moves the column icons.

S703: Cyclically move the icons on the column of the icon on which the user sliding operation is located.

In an example, if the sliding direction is upward sliding, the icons in the related column of the icon on which the user sliding operation is located are all translated upward for display, and icons removed from the top are moved to the display page from the bottom of the related column on the display page for display. In another example, if the sliding direction is downward sliding, the icons in the related column of the icon on which the user sliding operation is located are all translated downward for display, and icons removed from the bottom are moved to the display page from the top of the related column on the display page for display. The icons in the related column in which the user sliding operation is located are cyclically moved.

S704: When the sliding direction or the pressing force direction of the first location is the horizontal direction, determine the related row of the icon on which the first location is located, and when $\ell$ of the user sliding operation is greater than $\Delta\ell$, move the row icons.

In an embodiment, when determining that the sliding direction or the pressing force direction of the first location is the horizontal direction, the terminal device may determine the related row of the icon on which the first location is located. Then, when $\ell$ is greater than $\Delta\ell$, the terminal device determines that the current user sliding operation is a row icon operation, and moves the row icons.

S705: Move the row icons in the row in which the user sliding operation is located.

In an embodiment, the row icons in the related row on the display page are moved by Y icons along the horizontal direction.

In an example, Y icons in a distance range of the first $\ell$ along the sliding direction in the related row of the icon on which the first location is located on the display page may be determined, and the Y icons may be removed from the display page. Y is a quantity of icons in the $\ell$ distance range, and Y is an integer. The remaining icons in the related row are moved by the distance $\ell$ along the sliding direction. In this case, there are vacant locations if no icon is supplemented with in the range of the first $\ell$ in the related row along a direction opposite to the sliding direction. The first Y icons that are arranged along the sliding direction and that are in a same row as the related row on the adjacent page of the display page in a direction opposite to the sliding direction are determined. In addition, the Y icons on the adjacent page are moved to the display page from a direction opposite to the sliding direction for display, to move the row icons on the display page. For example, when the user presses an icon for a period of time and leftward slides the icon by two icon locations, two leftmost icons on the row are removed from the display page, and the two leftmost icons are moved from a same row on the adjacent page on the right of the display page to the display page from the right of the related row on the display page, to implement icon supplementation on a single row on the display page.

In an example, Y icons in a range of the first $\ell$ along the sliding direction in the related row of the icon on which the current user sliding operation is located need to be determined, and the Y icons need to be removed from the display page. Then, the remaining icons in the related row on the display page are translated along the sliding direction, and icons that are located in a same row as the related row and that are on the adjacent page in a direction opposite to the sliding direction of the display page are selected to supplement the display page, so as to supplement the row icons. In another example, icons that are displayed before the user sliding operation is performed are translated leftward or rightward and then displayed along the sliding direction. Icons that are removed from the screen are not displayed.

In another embodiment, a quantity of icons in a same horizontal direction of the adjacent page in a direction opposite to the movement direction of the display page may be further determined. When there is at least one icon in the same row as the related row on the adjacent page, and a quantity of icons in the same row as the related row on the adjacent page are insufficient to supplement the row icons, a quantity P of icons in the related row on the adjacent page is determined. P is a positive integer, and 0<P<Y. All the icons in the related row on the display page are moved by P icons along the horizontal direction, icons that fall outside the display page after the movement are removed, and P icons in the same row as the related row on the adjacent page are moved to the same row on the display page.

In an example, the first P icons on the display page along the sliding direction may be removed from the display page, the remaining icons on the display page are moved to the top along the sliding direction, and P icons arranged along the sliding direction of the adjacent page are moved to the display page. A person skilled in the art should know that, if the quantity P of icons in the related row on the adjacent page is greater than or equal to 1 and less than Y, the P icons instead of Y icons are removed from the related row on the display page along the sliding direction. Then, the P icons on the adjacent page are moved to the display page for supplementation. For example, when the user presses an icon for a period of time and leftward slides the icon by two icon locations, if there is only one icon in a same row as that on the adjacent page on the right of the display page, one leftmost icon in the related row on the display page is removed from the display page, and the only one icon in the same row as that on the adjacent page on the right of the display page is moved to the display page, to supplement icons on a single row on the display page.

In still another embodiment, when the sliding direction is the horizontal direction, if there is no icon in the related row on the adjacent page, that is, P is 0, the terminal device may cancel the user sliding operation.

It may be understood that, when the quantity of icons that are in the same row as the related row and that are on the adjacent page in a direction opposite to the sliding direction of the display page are insufficient to supplement vacant locations in the related row on the display page, the terminal device in this disclosure may preferentially perform adaptive supplementation at a location at which supplementation can be performed. For example, when two icons need to be supplemented with in the related row in which the user sliding operation is located, and there is only one icon in the same row as the related row on the adjacent page, only one icon is moved to the display page for supplementation. A user sliding operation that is performed with no icon existing in the related row on the adjacent page may be ignored.

A person skilled in the art should know that, when related row movement is performed, if vacant locations exist in the related row on the display page, icons are not fully arranged. In this case, if icons exist in the related row on the adjacent page, vacant locations in the related row also move along the movement direction in a process of moving the related row on the display page. Existing vacant locations are not supplemented with icons moved to the display page. When related column movement is performed, if vacant locations exist in the related column on the display page, icons are not fully arranged. In this case, vacant locations in the related column also move along the movement direction in a process of moving the column row on the display page. Existing vacant locations are not supplemented with icons cyclically moved to the display page.

In still another embodiment, after the user sliding operation ends, an icon distribution status on the current screen is further presented by using the screen of the terminal device. In an example, screen icons that are finally presented are aligned and not misplaced.

Figure 9:
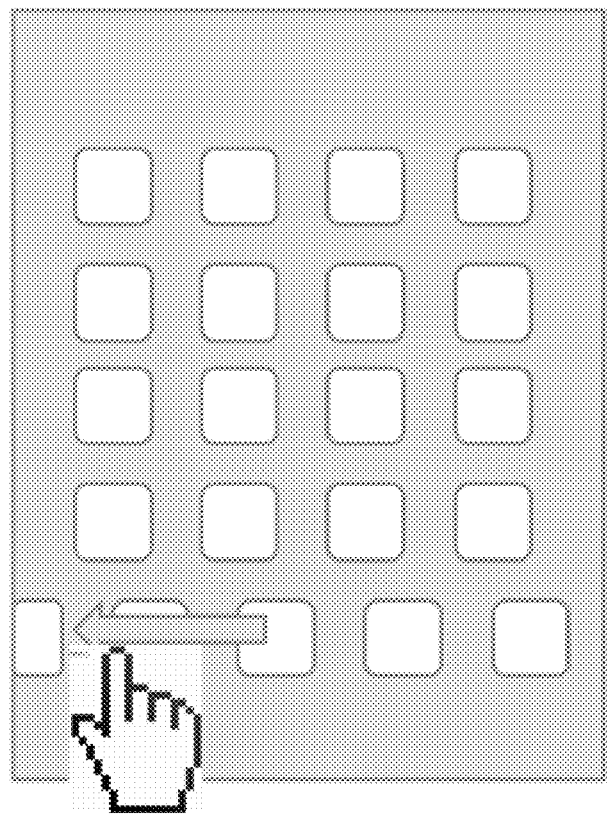
FIG. 9 is a schematic diagram of another type of screen display of screen icon operating according to an embodiment of this disclosure.

FIG. 9 is a schematic diagram of another type of screen display of screen icon operating according to an embodiment of this disclosure.

FIG. 9 is a schematic diagram of screen display of a single row operation according to this disclosure. As shown in FIG. 9, when the user presses an icon, and pressing duration is between the first duration threshold and the second duration threshold, row icons are moved. In an example, a sliding direction shown in FIG. 9 is leftward sliding, and the terminal device determines screen icon locations in a related row of an icon on which a user sliding operation is located on a current screen display interface. Then, the terminal device determines icons on a next interface. Icons displayed on the display page are translated in the sliding direction, for example, translated leftward in FIG. 9. Icons that are removed from the screen are not displayed. The ions on the next interface are sequentially displayed on the right of the related row of the user sliding operation, to supplement the row icons. A person skilled in the art should know that a case in which the sliding direction is rightward sliding is similar to the case in which the sliding direction is leftward sliding. For ease of description, details are not described herein again.

Figure 10:
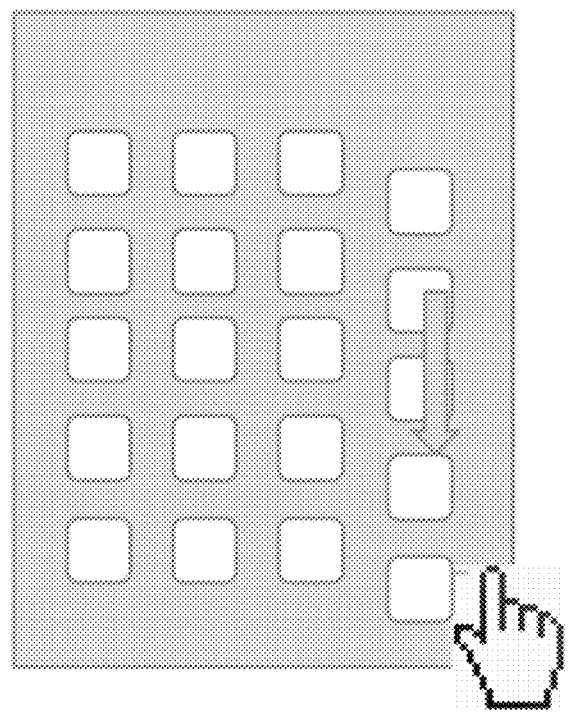
FIG. 10 is a schematic diagram of still another type of screen display of screen icon operating according to an embodiment of this disclosure.

FIG. 10 is a schematic diagram of still another type of screen display of screen icon operating according to an embodiment of this disclosure.

FIG. 10 is a schematic diagram of screen display of a single column operation according to this disclosure. As shown in FIG. 10, when the user presses an icon, and pressing duration is between the first duration threshold and the second duration threshold, column icons are moved. In an example, a sliding direction shown in FIG. 10 is downward sliding, and the terminal device determines screen icon locations in a related column of an icon on which a user sliding operation is located on a current screen display interface. Then, icons displayed on the display page are translated in the sliding direction. Icons that are removed from the screen and that are on the bottom of the related column of the user sliding operation are sequentially displayed on the top of the related row, and are cyclically supplemented with. A person skilled in the art should know that a case in which the sliding direction is upward sliding is similar to the case in which the sliding direction is downward sliding. For ease of description, details are not described herein again.

Figure 11:
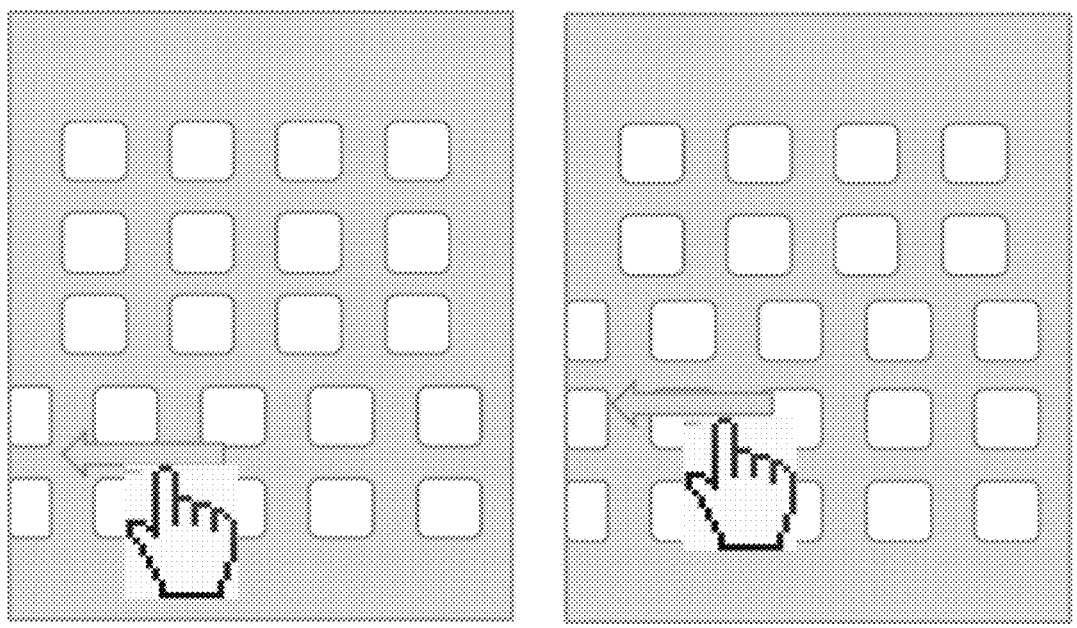
FIG. 11 is a schematic diagram of yet another type of screen display of screen icon operating according to an embodiment of this disclosure.

FIG. 11 is a schematic diagram of yet another type of screen display of screen icon operating according to an embodiment of this disclosure.

FIG. 11 is a schematic diagram of yet another type of screen display of screen icon operating according to this disclosure. For the screen icon operating methods shown in FIG. 2 to FIG. 10, only a single row or a single column is used as an example. A person skilled in the art should know that, when the initial location of the user sliding operation is not unique, multi-row or multi-column operations may be separately performed based on different initial locations. In an example, when the user presses a plurality of different rows or columns with two fingers, row icons or column icons on the plurality of pressed rows or columns may be moved. In another example, a plurality of rows or columns may be or may not be adjacent rows/columns. This is not limited in this disclosure.

In another example, when the initial location of the user sliding operation is not unique, a plurality of consecutive rows or columns may be s to move. For example, when the sliding direction is the horizontal direction, a plurality of initial locations with a maximum distance difference in the vertical direction are determined, rows included in the location interval are determined, and the plurality of included rows are moved. For another example, when the sliding direction is the vertical direction, a plurality of initial locations with a maximum distance difference in the horizontal direction are determined, columns included in the location interval are determined, and the plurality of included columns are moved.

A person skilled in the art should know that, if the initial location of the user sliding operation is not unique, a single-row or single-column operation may be performed for each of the plurality of initial locations.

A person skilled in the art should further know that, when movement of a plurality of related rows is performed, if vacant locations exist in the related rows on the display page, icons are not fully arranged. In this case, if icons exist in the related row on the adjacent page, vacant locations in the related row also move along the movement direction in a process of moving the related row on the display page. Existing vacant locations are not supplemented with icons moved to the display page. In addition, when a plurality of related rows on the adjacent page are moved to the display page, a related row with a largest quantity of icons on the adjacent page may be moved to the display page at most, or a related row with a smallest quantity of icons on the adjacent page may be moved to the display page at most. This is not limited in embodiments of this disclosure. A person skilled in the art should further know that, if a related row with a largest quantity of icons on the adjacent page is moved to the display page at most, after icons in other related rows are all moved to the display page, the movement may continue, and idle icon locations are displayed as vacant locations.

A person skilled in the art should further know that, when movement of a plurality of related columns is performed, if vacant locations exist in the related columns on the display page, icons are not fully arranged. In this case, vacant locations in the related column also move along the movement direction in a process of moving the column row on the display page. Existing vacant locations are not supplemented with icons cyclically moved to the display page.

As shown in FIG. 11, on the left interface of FIG. 11, two rows of icons are moved at the same time, and on the right interface of FIG. 11, three rows of icons are moved at the same time.

This disclosure discloses a screen icon operating method and apparatus, to determine, by using collected touch information, whether a current user sliding operation is an entire screen operation or a row/column icon operation. For the entire screen operation, a conventional operation may be excluded based on a sliding speed, and entire-screen icon movement is performed based on the touch information. For the row/column icon operation, a conventional operation may be excluded based on pressing duration, a related row or a related column of the user sliding operation is determined based on a sliding direction or a pressing force direction of a first location, and row or column icon movement is performed on the related row or the related column based on a sliding distance. In the foregoing manner, a corresponding icon can be quickly found. In addition, when an input device is a finger, for a large-screen terminal device whose size exceeds a specific size, operations can be quickly implemented with one hand. Therefore, the operations are simpler and more convenient, and user operation experience is improved.

Figure 12A:
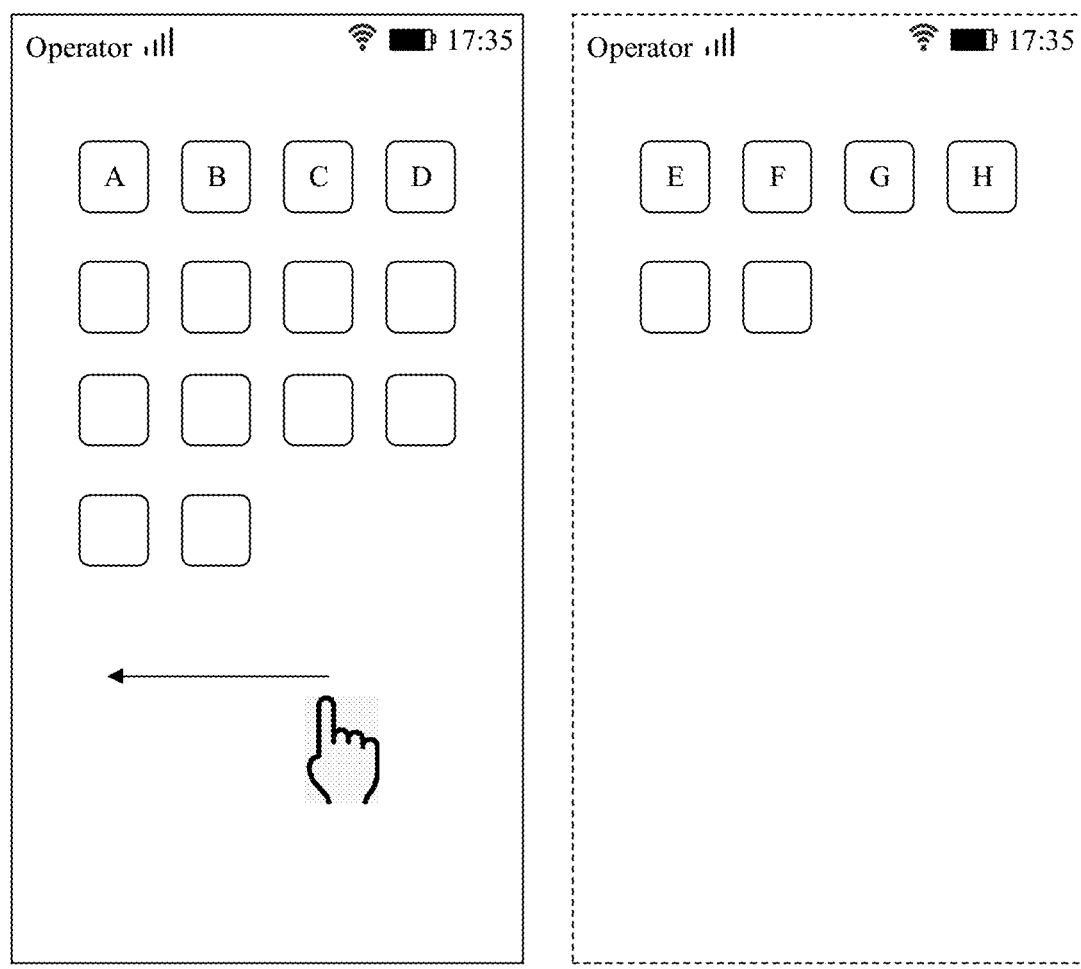
FIG. 12A is a schematic diagram of another type of screen display of screen icon operating according to an embodiment of this disclosure.

FIG. 12A is a schematic diagram of another type of screen display of screen icon operating according to an embodiment of this disclosure. In a relatively detailed example, when the user operates a screen icon on the terminal device, as shown in FIG. 12A, a touch location of the user is not on an icon on the display page. In this case, it is determined whether a sliding speed of the current user sliding operation is less than the sliding speed threshold. Assuming that the sliding speed is less than the sliding speed threshold, entire-screen icon movement is performed. For example, the left half part in FIG. 12A displays the display page. It can be learned that an arrow of the display page points to a sliding direction. In this case, the terminal device needs to determine icons on an adjacent page on the right of the display page, that is, icons shown in the right half part in FIG. 12A.

Figure 12B:
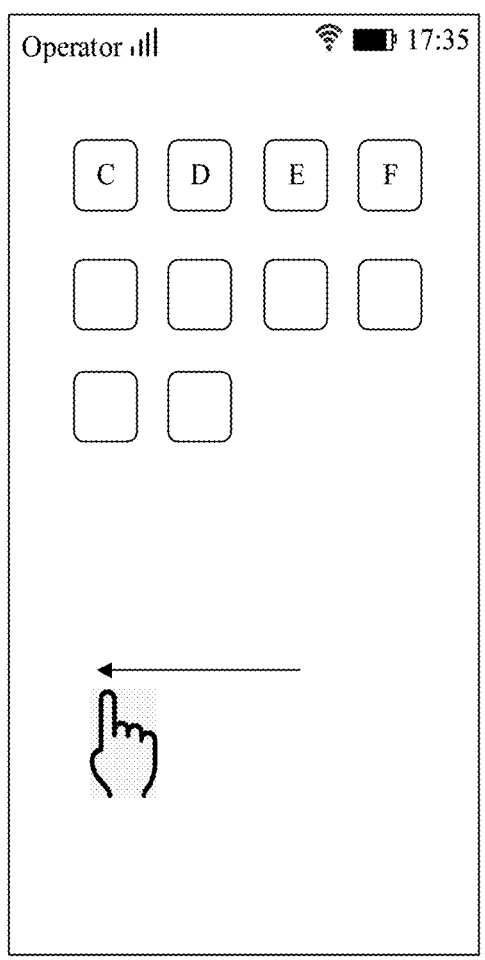
FIG. 12B is a schematic diagram of still another type of screen display of screen icon operating according to an embodiment of this disclosure.

In an example, if it is determined, based on a sliding distance, that column A and column B on the left of the display page are removed, column E and column F on the adjacent page need to be moved to the display page. After the final movement is completed, as shown in FIG. 12B, the display page displays columns C, D, E, and F instead of columns A, B, C, and D.

Figure 12C:
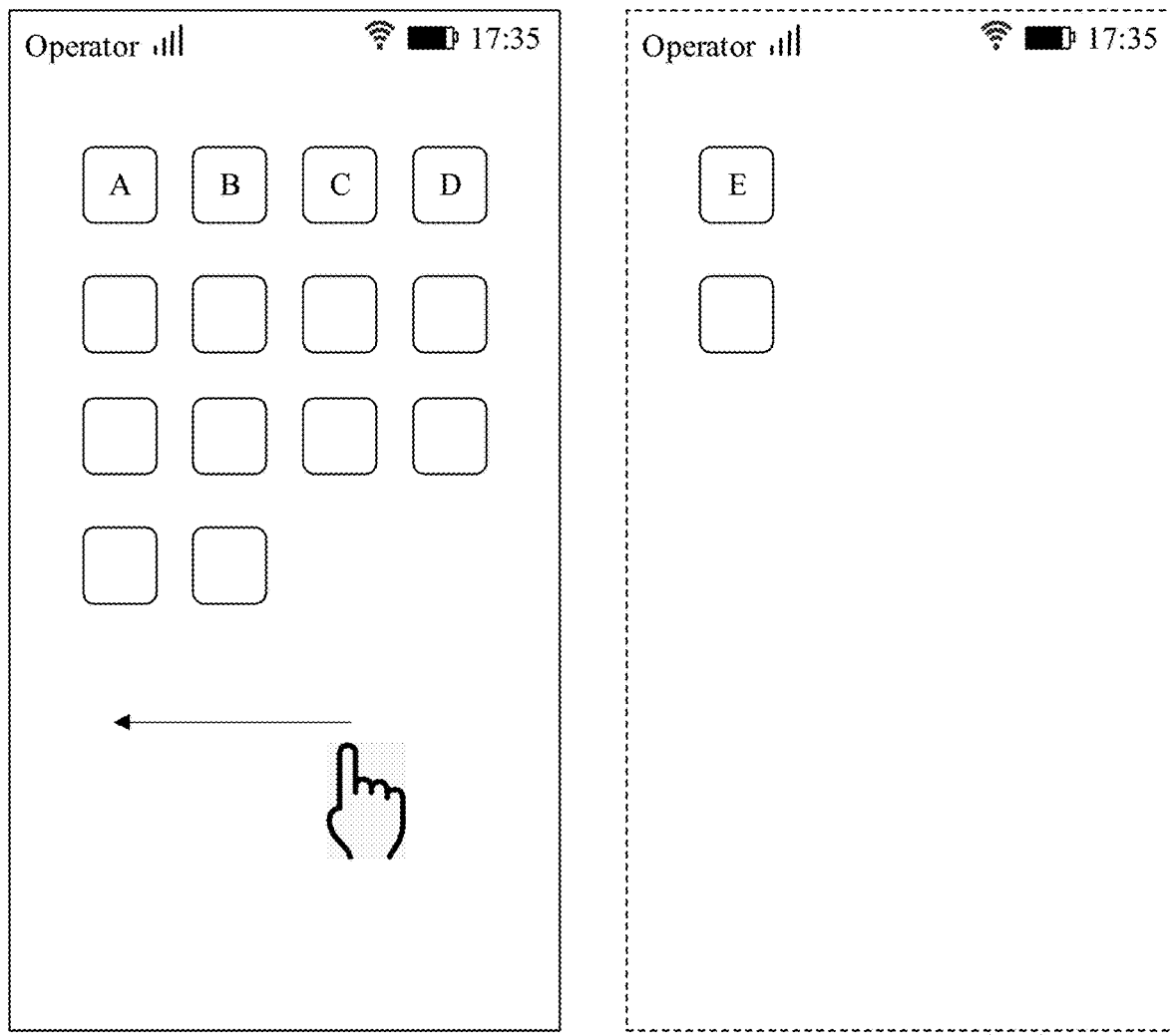
FIG. 12C is a schematic diagram of yet another type of screen display of screen icon operating according to an embodiment of this disclosure.
Figure 12D:
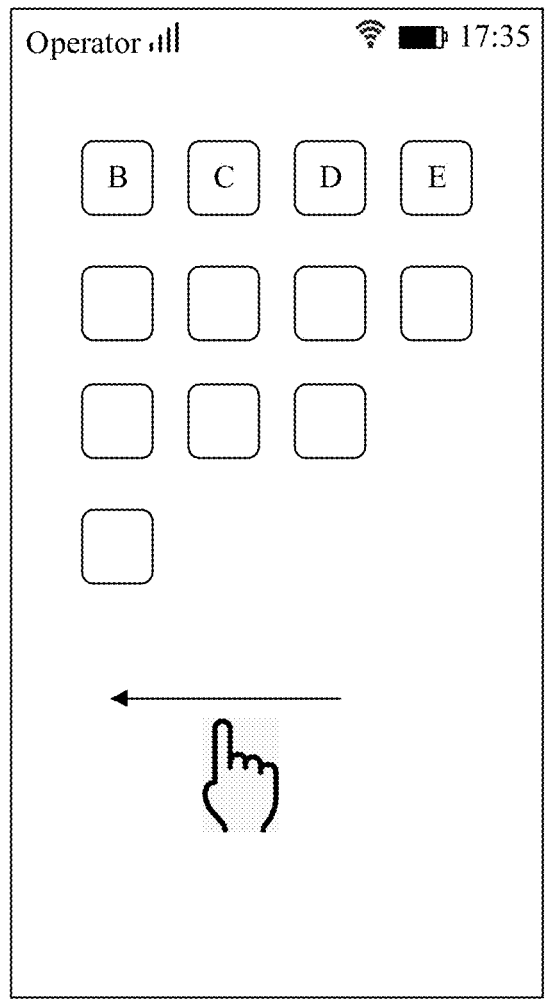
FIG. 12D is a schematic diagram of another type of screen display of screen icon operating according to an embodiment of this disclosure.

In another example, it is determined, based on a sliding distance, that column A and column B on the left of the display page are removed. However, there is at least one column of icons on the adjacent page, but a quantity of columns of icons on the adjacent page is less than a quantity of columns removed from the display page. In this case, the right half part in FIG. 12C shows only icons in column E on the adjacent page. In this case, the terminal device does not remove column A and column B from the display page, but removes only column A from the display page, and moves column E on the adjacent page to the display page. After the final movement is completed, as shown in FIG. 12D, the display page displays columns A, B, C, and D instead of columns B, C, D, and E.

A person skilled in the art should know that FIG. 12A to FIG. 12D show only a change of the display page of the terminal device when the arrow points leftward. It should be understood that, for a case in which the screen is rightward, a difference lies only in an opposite direction, and other changes are the same as those shown in FIG. 12A to FIG. 12D.

Figure 13A:
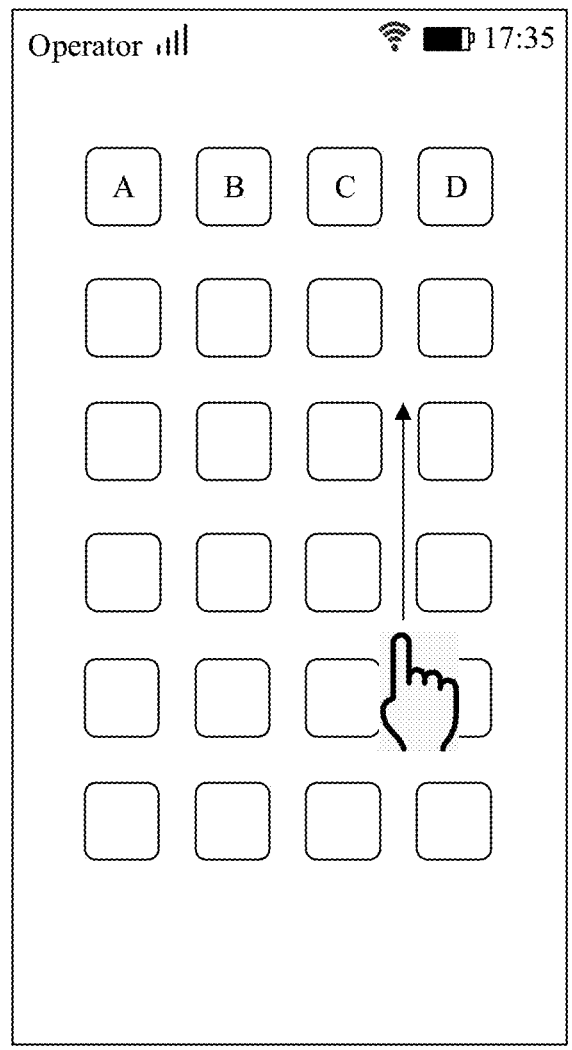
FIG. 13A is a schematic diagram of still another type of screen display of screen icon operating according to an embodiment of this disclosure.

FIG. 13A is a schematic diagram of yet another type of screen display of screen icon operating according to an embodiment of this disclosure.

In a relatively detailed example, when the user operates a screen icon on the terminal device, as shown in FIG. 13A, a touch location of the user is not on an icon on the display page. In this case, it is determined whether a sliding speed of the current user sliding operation is less than the sliding speed threshold. Assuming that the sliding speed is less than the sliding speed threshold, entire-screen icon movement is performed. For example, FIG. 13A shows the display page. It may be learned that an arrow of the display page points to a sliding direction, that is, a vertical direction. In this case, the terminal device performs sliding, and current screen icons are cyclically supplemented with.

In an example, if it is determined, based on a sliding distance, that the first row and the second row on the top of the display page are removed, the two removed rows need to be moved to the display page from the bottom of the display page. After the final movement is completed, as shown in FIGS. 13B, A, B, C, and D on the first row displayed on the display page are moved to the penultimate row of the display page for display.

Figure 13B:
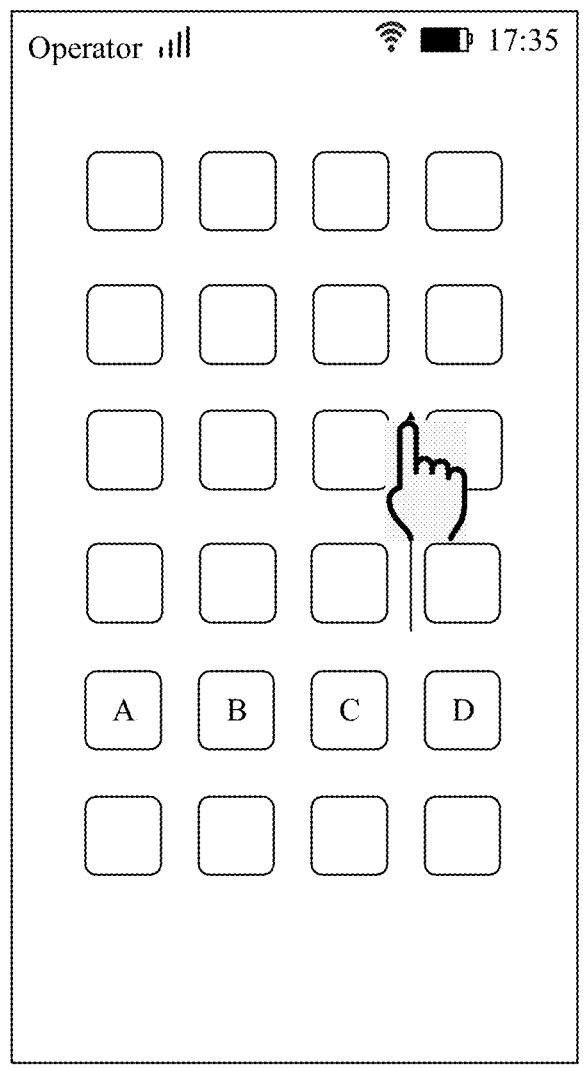
FIG. 13B is a schematic diagram of yet another type of screen display of screen icon operating according to an embodiment of this disclosure.

A person skilled in the art should know that FIG. 13A and FIG. 13B show only a change of the display page of the terminal device when the arrow points upward. It should be understood that, for a case in which the screen is downward, a difference lies only in an opposite direction, and other changes are the same as those shown in FIG. 13A and FIG. 13B.

A person skilled in the art should further know that, as shown in FIG. 12A and FIG. 13B, if vacant locations originally exist on the display page, icons are not fully arranged. In a case of horizontal movement, if icons exist on the adjacent page, vacant locations originally existing on the display page also move along a movement direction in a movement process. Existing vacant locations are not supplemented with icons moved to the display page. In a case of vertical movement, existing vacant locations are not supplemented with icons cyclically moved to the display page.

Figure 14A:
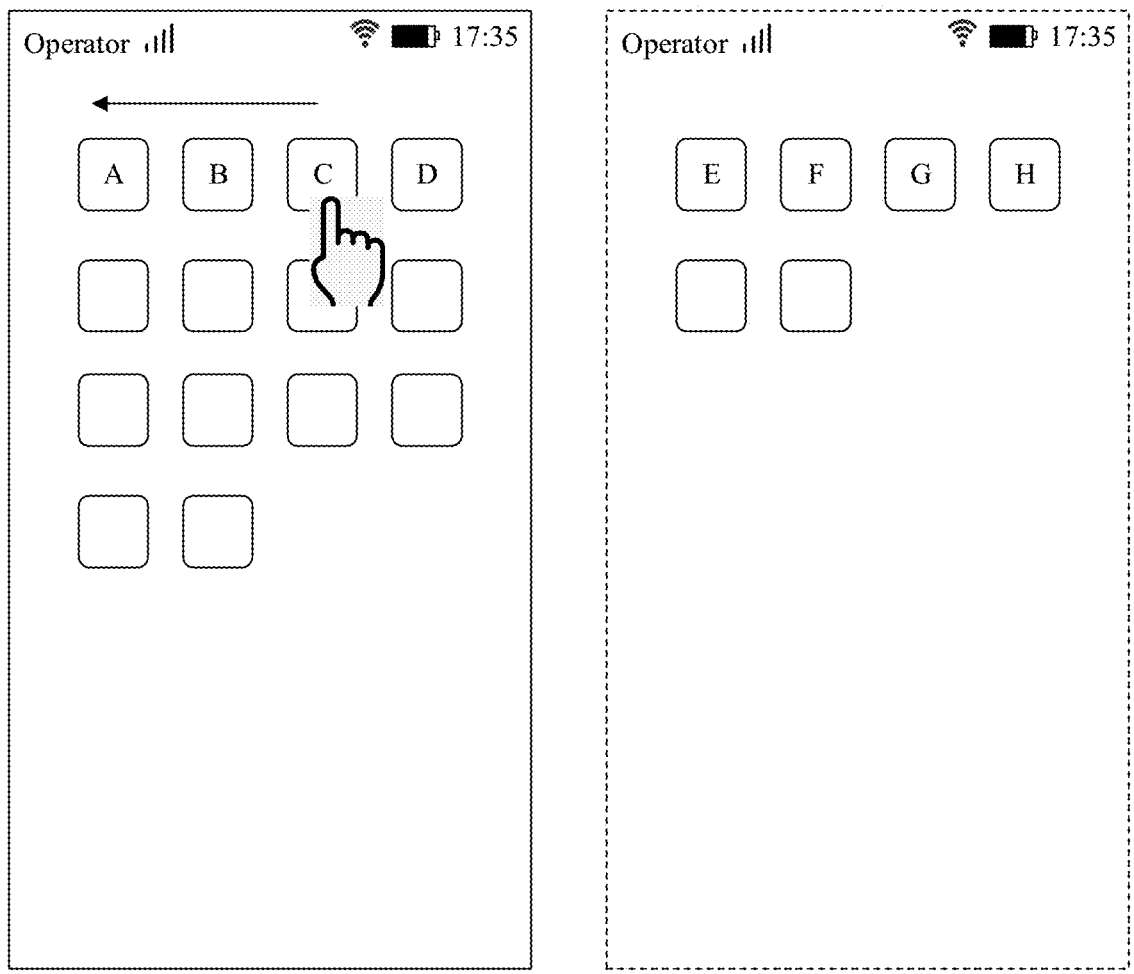
FIG. 14A is a schematic diagram of another type of screen display of screen icon operating according to an embodiment of this disclosure.

FIG. 14A is a schematic diagram of another type of screen display of screen icon operating according to an embodiment of this disclosure.

In a relatively detailed example, when the user operates a screen icon on the terminal device, as shown in FIG. 14A, a touch location of the user is located on an icon on the display page, for example, icon C. In this case, it is determined whether pressing duration of the current user sliding operation is between the first duration threshold and the second duration threshold. Assuming that the pressing duration is between the first duration threshold and the second duration threshold, row icon movement is performed on a related row of icon C or column icon movement is performed on a related column of icon C. For example, the left half part in FIG. 14A displays the display page. It can be learned that an arrow of the display page points to a sliding direction. In this case, the terminal device needs to determine icons on an adjacent page on the right of the display page, that is, icons shown in the right half part in FIG. 14A.

Figure 14B:
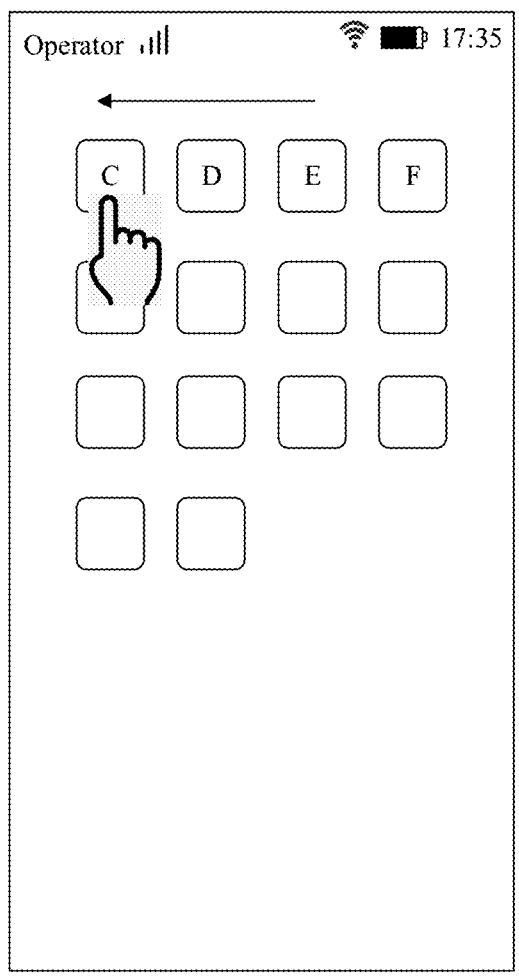
FIG. 14B is a schematic diagram of still another type of screen display of screen icon operating according to an embodiment of this disclosure.

In an example, it is determined, based on a sliding distance, that icon A and icon B on the left are removed from the related row of C on the display page, that is, the first row. In this case, icon E and icon F on the first row of the adjacent page need to be moved to the related row of the display page. After the final movement is completed, as shown in FIG. 14B, the first row displayed on the display page changes from icon A, icon B, icon C, and icon D to icon C, icon D, icon E, and icon F. In addition, icons in other rows are not moved.

Figure 14C:
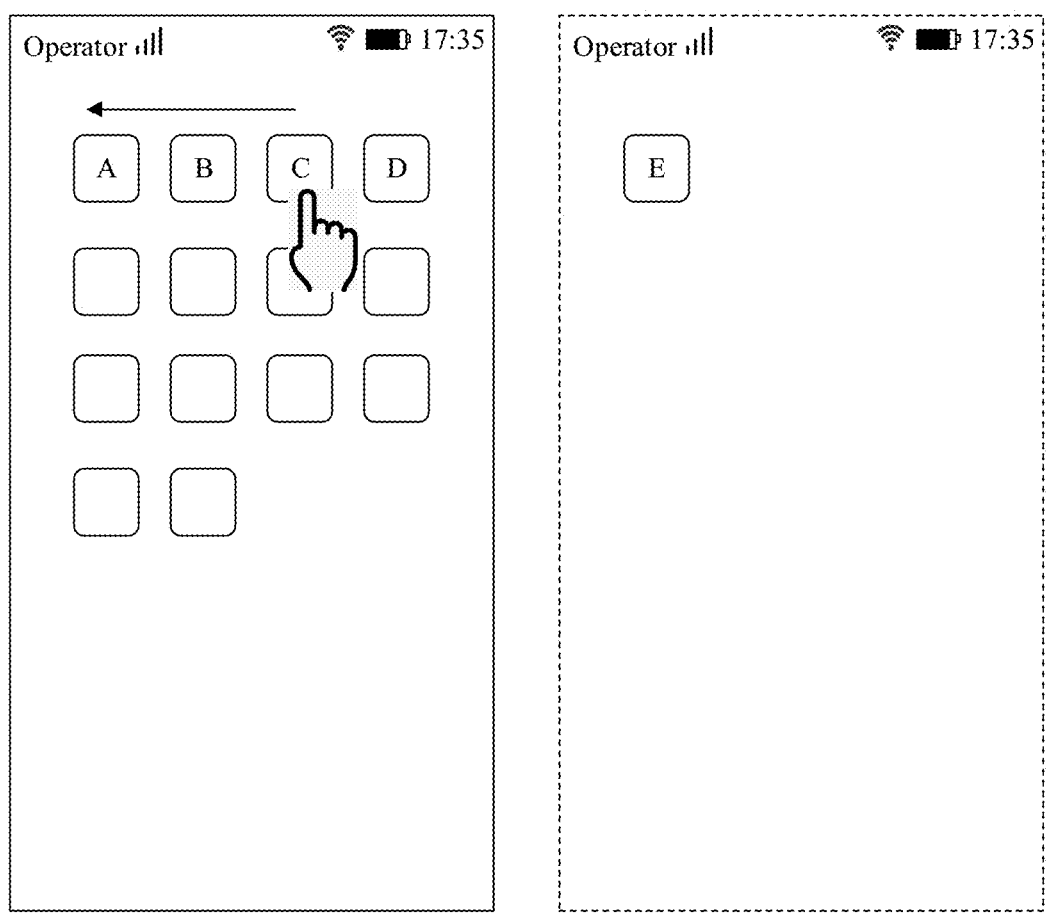
FIG. 14C is a schematic diagram of yet another type of screen display of screen icon operating according to an embodiment of this disclosure.
Figure 14D:
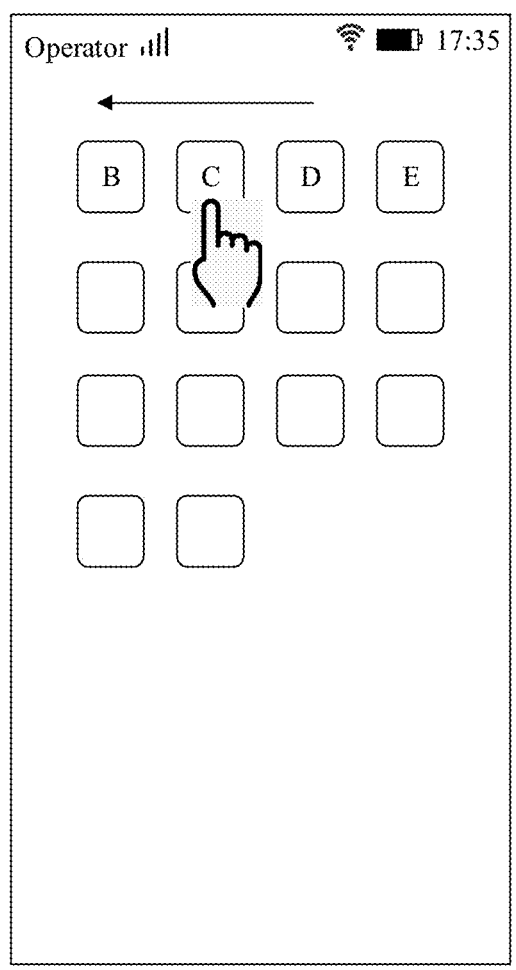
FIG. 14D is a schematic diagram of another type of screen display of screen icon operating according to an embodiment of this disclosure.

In another example, it is determined, based on a sliding distance, that icon A and icon B on the left are removed from the related row of C on the display page, that is, the first row. However, there is at least one icon in a related row on an adjacent page, but a quantity of icons in the related row on the adjacent page is less than a quantity of icons removed from the related row on the display page. In this case, the right half part in FIG. 14C shows only icon E on the adjacent page. In this case, the terminal device does not remove icon A and icon B from the display page, but removes only icon A from the display page, and moves icon E on the adjacent page to the display page. After the final movement is completed, as shown in FIG. 14D, the display page displays icon B, icon C, icon D, and icon E instead of icon A, icon B, icon C, and icon D.

A person skilled in the art should know that FIG. 14A to FIG. 14D show only a change of the display page of the terminal device when the arrow points leftward. It should be understood that, for a case in which the screen is rightward, a difference lies only in an opposite direction, and other changes are the same as those shown in FIG. 14A to FIG. 14D.

Figure 15A:
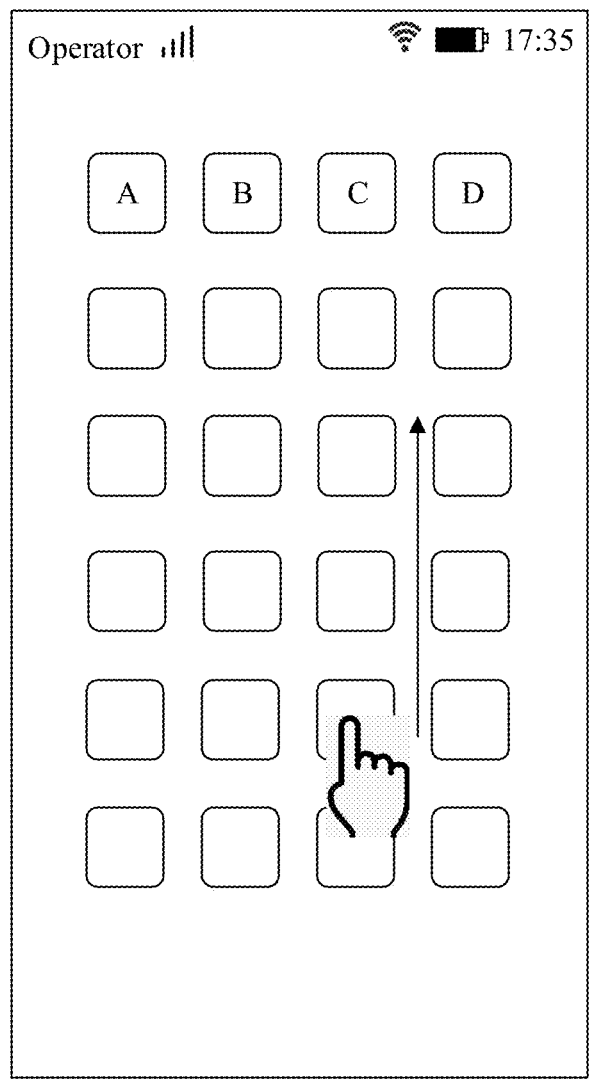
FIG. 15A is a schematic diagram of still another type of screen display of screen icon operating according to an embodiment of this disclosure.

FIG. 15A is a schematic diagram of still another type of screen display of screen icon operating according to an embodiment of this disclosure.

In a relatively detailed example, when the user operates a screen icon on the terminal device, as shown in FIG. 15A, a touch location of the user is located on an icon on the fifth row and the third column on the display page. In this case, it is determined whether pressing duration of the current user sliding operation is between the first duration threshold and the second duration threshold. Assuming that the pressing duration is between the first duration threshold and the second duration threshold, row icon movement is performed on a related row of the touch point or column icon movement is performed on a related column of the touch point. For example, FIG. 15A shows the display page. It may be learned that an arrow of the display page points to a sliding direction, that is, a vertical direction. In this case, the terminal device moves column icons in the related column, and cyclically supplements the column icons in the related column on the current screen.

Figure 15B:
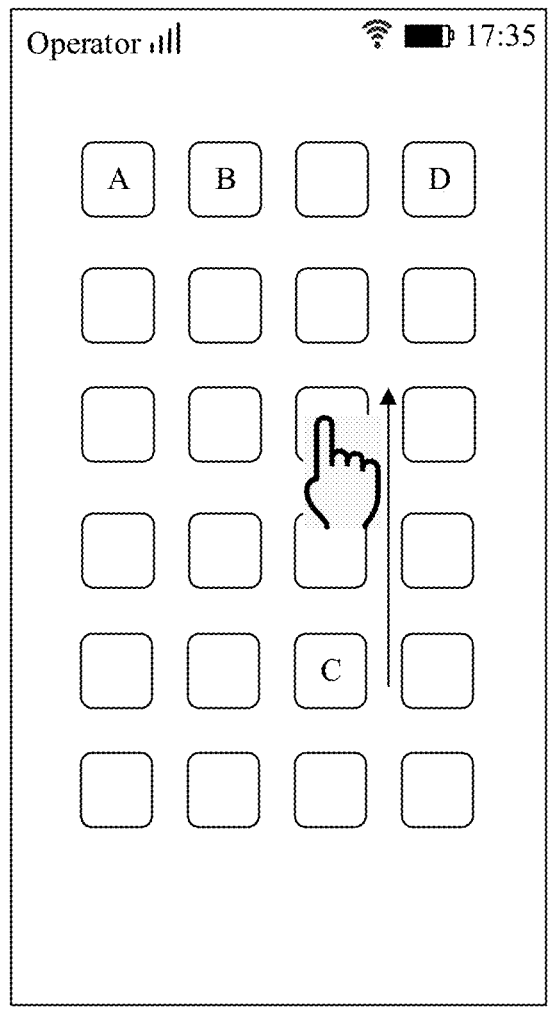
FIG. 15B is a schematic diagram of yet another type of screen display of screen icon operating according to an embodiment of this disclosure.

In an example, if it is determined, based on a sliding distance, that the first icon and the second icon on the top of the related column on the display page are removed, the two removed icons need to be moved to the display page from the bottom of the related column on the display page. After the final movement is completed, as shown in FIG. 15B, icon C in the related column displayed on the display page is moved to the penultimate location in the related column on the display page for display. In addition, icons in other columns are not moved.

A person skilled in the art should know that FIG. 15A and FIG. 15B show only a change of the display page of the terminal device when the arrow points upward. It should be understood that, for a case in which the screen is downward, a difference lies only in an opposite direction, and other changes are the same as those shown in FIG. 15A and FIG. 15B.

A person skilled in the art should further know that, as shown in FIG. 14A and FIG. 15B, if vacant locations originally exist on the display page, icons are not fully arranged. In a case of horizontal movement, if icons exist in the related row on the adjacent page, vacant locations originally existing on the display page also move along a movement direction in a movement process. Existing vacant locations are not supplemented with icons moved to the display page. In a case of vertical movement, existing vacant locations are not supplemented with icons cyclically moved to the display page.

Figure 16A:
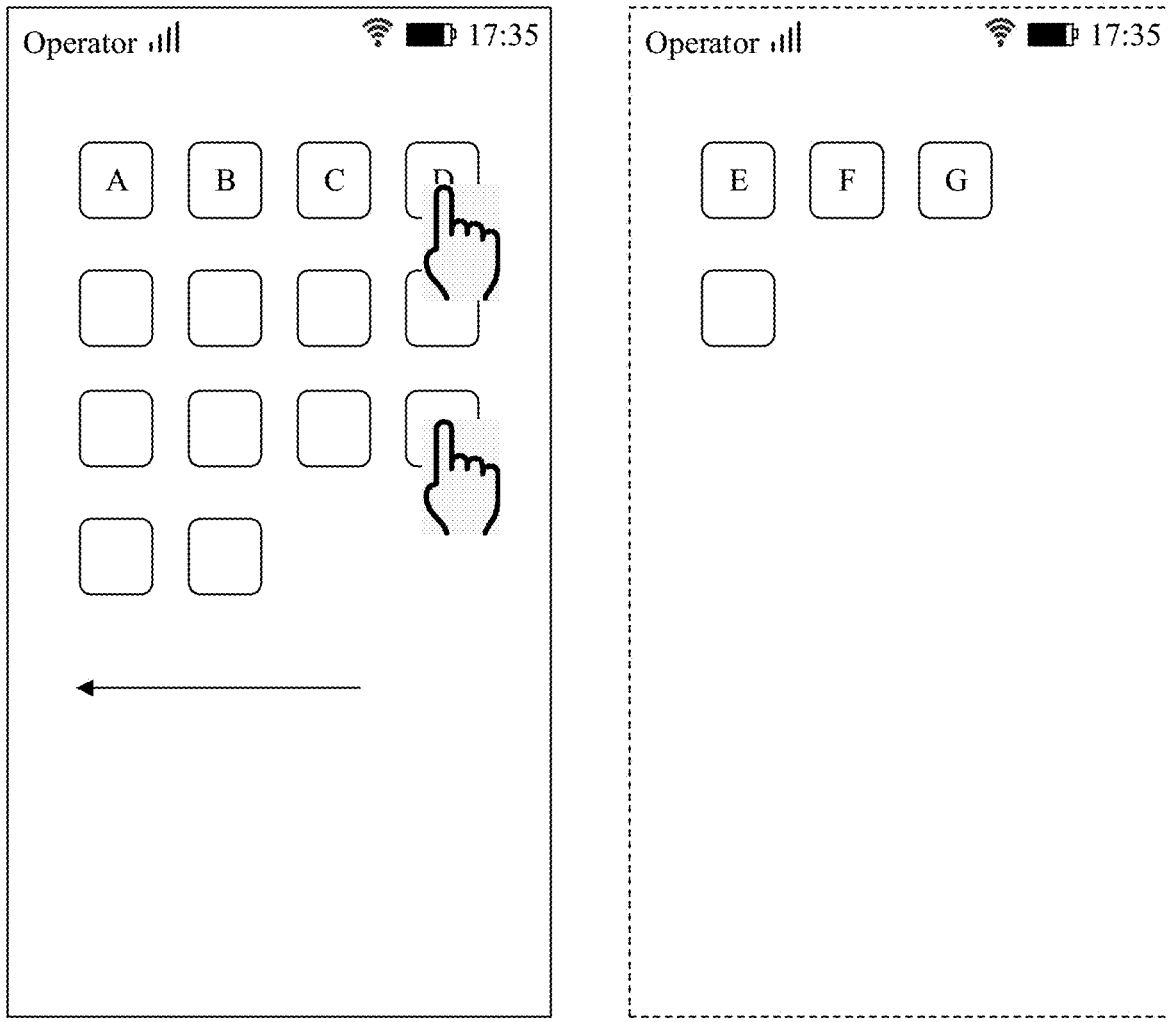
FIG. 16A is a schematic diagram of another type of screen display of screen icon operating according to an embodiment of this disclosure.

FIG. 16A is a schematic diagram of another type of screen display of screen icon operating according to an embodiment of this disclosure. In a relatively detailed example, when the user operates a screen icon on the terminal device, as shown in FIG. 16A, touch locations of the user are on at least two icons on the display page. In this case, it is determined whether pressing duration of the current user sliding operation is between the first duration threshold and the second duration threshold. Assuming that the pressing duration is between the first duration threshold and the second duration threshold, at least two related rows or at least two related columns between a plurality of touch points are determined, and row icon movement is performed on the at least two related rows or column icon movement is performed on the at least two related columns. For example, FIG. 16A shows the display page. It may be learned that an arrow of the display page points to a sliding direction. The terminal device needs to determine icons on an adjacent page on the right of the display page, that is, icons shown in the right half part in FIG. 16A.

Figure 16B:
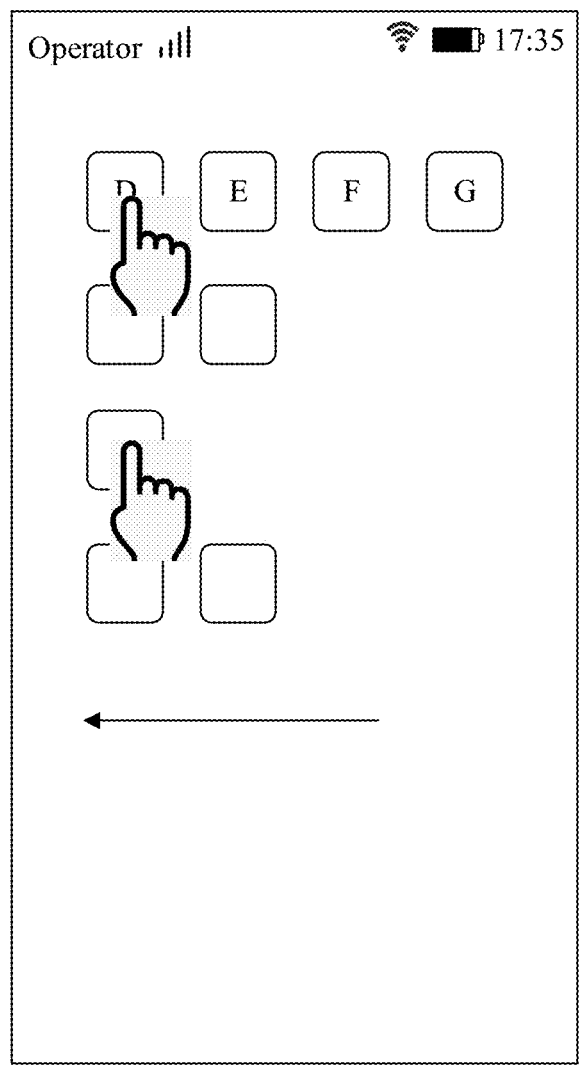
FIG. 16B is a schematic diagram of still another type of screen display of screen icon operating according to an embodiment of this disclosure.

In an example, it is determined, based on a sliding distance, that two leftmost icons on the at least two related rows on the display page are removed. In this case, icons on at least two corresponding related rows on the adjacent page need to be moved to the at least two related rows on the display page. It is assumed that, when a corresponding related row with a largest quantity of icons on the adjacent page is moved at most, as shown in FIG. 16B, after the final movement is completed, the first three icons on the first row to the third row displayed on the display page are removed from the display page, and the icons on the first row to third row are moved to the corresponding related rows on the adjacent page. In addition, icons in other rows than the related rows are not moved, for example, the last row of icons on the display page.

Figure 16C:
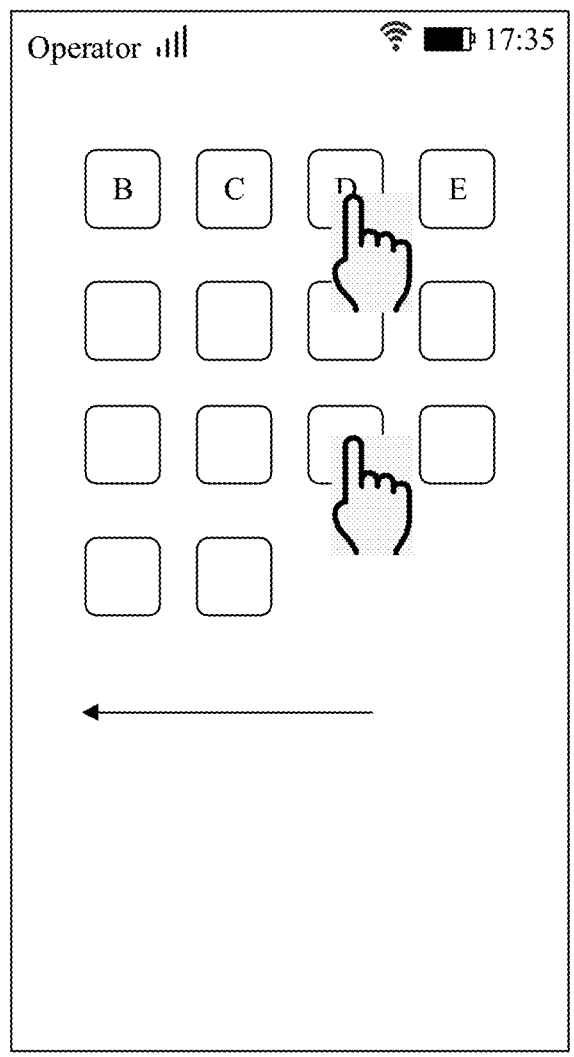
FIG. 16C is a schematic diagram of yet another type of screen display of screen icon operating according to an embodiment of this disclosure.

In another example, it is determined, based on a sliding distance, that two leftmost icons on the at least two related rows on the display page are removed. In this case, it is assumed that, when a corresponding related row with a smallest quantity of icons on the adjacent page is moved at most, as shown in FIG. 16C, after the final movement is completed, only the first icon on the first row to the third row displayed on the display page is removed from the display page, and the icons on the first row to third row are moved to the corresponding related rows on the adjacent page. In addition, icons in other rows than the related rows are not moved, for example, the last row of icons on the display page.

A person skilled in the art should know that FIG. 16A to FIG. 16C show only a change of the display page of the terminal device when the arrow points leftward. It should be understood that, for a case in which the screen is rightward, a difference lies only in an opposite direction, and other changes are the same as those shown in FIG. 16A to FIG. 16C.

Figure 17A:
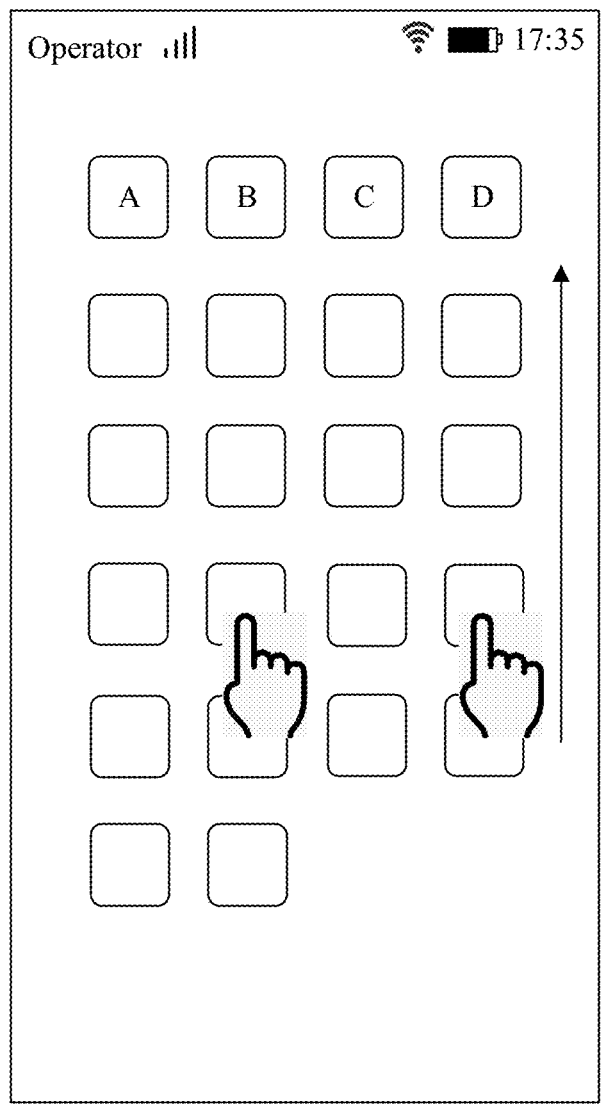
FIG. 17A is a schematic diagram of another type of screen display of screen icon operating according to an embodiment of this disclosure.

FIG. 17A is a schematic diagram of another type of screen display of screen icon operating according to an embodiment of this disclosure. In a relatively detailed example, when the user operates a screen icon on the terminal device, as shown in FIG. 17A, touch locations of the user are on at least two icons on the display page. In this case, it is determined whether pressing duration of the current user sliding operation is between the first duration threshold and the second duration threshold. Assuming that the pressing duration is between the first duration threshold and the second duration threshold, at least two related rows or at least two related columns between a plurality of touch points are determined, and row icon movement is performed on the at least two related rows or column icon movement is performed on the at least two related columns. For example, FIG. 17A shows the display page. It may be learned that an arrow of the display page points to a sliding direction, that is, a vertical direction. In this case, the terminal device moves column icons on at least two related columns, and cyclically supplements the column icons on the at least two related columns on the current screen.

Figure 17B:
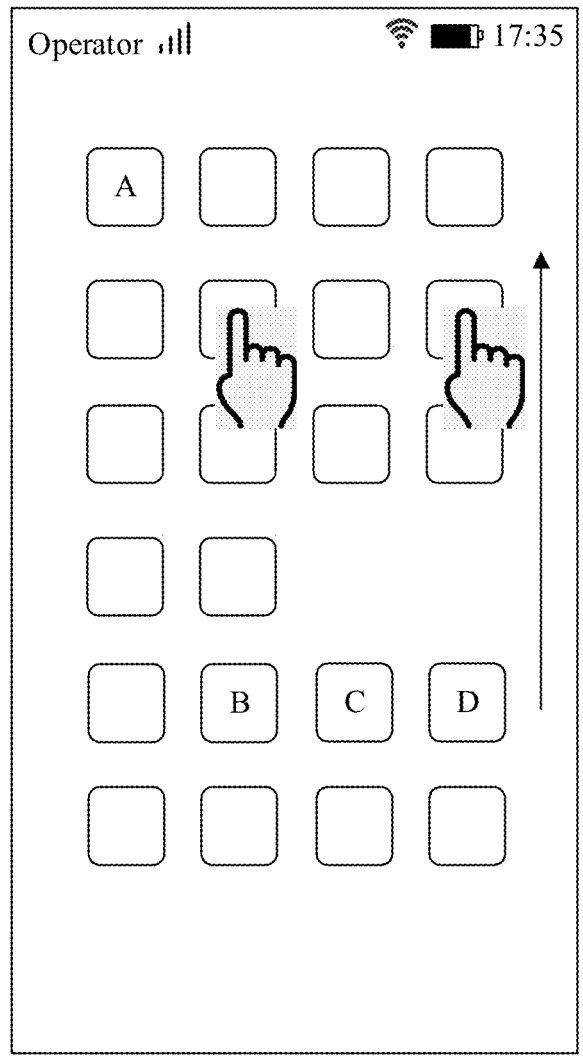
FIG. 17B is a schematic diagram of still another type of screen display of screen icon operating according to an embodiment of this disclosure.

In an example, if it is determined, based on a sliding distance, that two icons on the top of the at least two related columns on the display page are removed, the two removed icons need to be moved to the display page from the bottom of the at least two related columns on the display page. After the final movement is completed, as shown in FIG. 17B, the first two icons on the second column to the fourth column displayed on the display page are removed from the display page, and the removed icons are moved to the display page from the bottom of the second column to the fourth column displayed on the display page. In addition, icons in other columns than the related columns are not moved, for example, the first column of icons on the leftmost of the display page.

A person skilled in the art should know that FIG. 17A and FIG. 17B show only a change of the display page of the terminal device when the arrow points upward. It should be understood that, for a case in which the screen is downward, a difference lies only in an opposite direction, and other changes are the same as those shown in FIG. 17A and FIG. 17B.

A person skilled in the art should further know that, as shown in FIG. 16A and FIG. 17B, if vacant locations originally exist on the display page, icons are not fully arranged. In a case of horizontal movement, if icons exist on the adjacent page, vacant locations originally existing on the display page also move along a movement direction in a movement process. Existing vacant locations are not supplemented with icons moved to the display page. In a case of vertical movement, existing vacant locations are not supplemented with icons cyclically moved to the display page.

Figure 18:
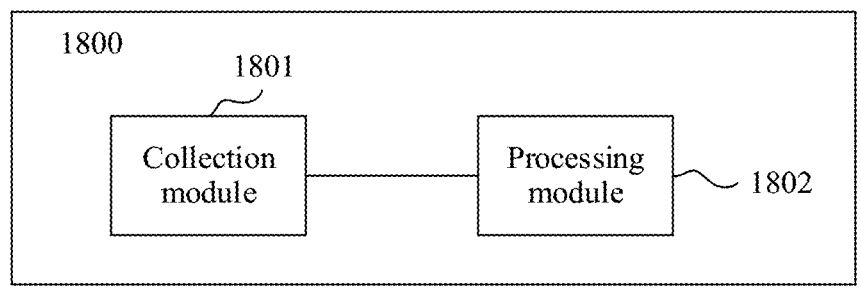
FIG. 18 is a schematic diagram of a screen icon operating framework according to an embodiment of this disclosure.

FIG. 18 is a schematic diagram of a screen icon operating apparatus according to an embodiment of this disclosure.

FIG. 18 provides a touchscreen icon operating apparatus 1800. The apparatus 1800 includes a collection module 1801 configured to collect user sliding operation information, where the user sliding operation information includes a first location, a sliding speed, pressing duration before sliding, or a sliding direction, and the first location is an initial location of a user sliding operation, and a processing module 1802 configured to, when the first location is not located on an icon, determine that the sliding speed is less than a sliding speed threshold, and move all icons on a display page in the sliding direction, or when the first location is located on the icon, determine that the pressing duration is greater than or equal to a first duration threshold and less than or equal to a second duration threshold, and move, in the sliding direction, column icons in a related column or row icons in a related row of the icon on which the first location is located on the display page.

In a possible implementation, the touch information further includes a second location, and the second location is a touch location at which the user sliding operation ends. The processing module 1802 is further configured to determine a sliding distance $\ell$ of the user sliding operation based on the first location and the second location, where $\ell$ is a projection distance of a straight-line distance between the second location and the first location in the sliding direction, and determine a supplementary parameter N, where N is determined by dividing $\ell$ by a unit switching distance $\Delta h$, $\Delta h$ is greater than or equal to a width of a single icon and less than or equal to a width of an entire screen, and $\Delta h$ is an integer multiple of the width of the single icon, and move all the icons on the display page by X rows or columns along the sliding direction, where X is a quantity of rows or columns of icons in an $N \times \Delta h$ range, and X is an integer.

In a possible implementation, the sliding direction includes a horizontal direction and a vertical direction, the horizontal direction is parallel to a first edge of the touchscreen, the vertical direction is parallel to a second edge of the touchscreen, and the first edge is perpendicular to the second edge. The processing module 1802 is further configured to, if the sliding direction is the horizontal direction, move all the icons on the display page by the X columns along the horizontal direction, or if the sliding direction is the vertical direction, cyclically move all the icons on the display page by the X rows along the vertical direction.

In a possible implementation, the processing module 1802 is further configured to remove icons that fall outside the display page after the movement, determine, from an adjacent page in a direction opposite to the sliding direction, X columns of icons adjacent to the display page, and move the icons to the display page.

In a possible implementation, the processing module 1802 is further configured to, when there are at least one column of icons on the adjacent page, and a quantity of columns of icons is less than X, determine a quantity Q of columns of icons on the adjacent page, where Q is a positive integer, and 0<Q<X, and move all the icons on the display page by Q columns along the horizontal direction, remove icons that fall outside the display page after the movement, and move the Q columns of icons on the adjacent page to the display page.

In a possible implementation, the processing module 1802 is further configured to, when there is no column of icons on the adjacent page, cancel the user sliding operation.

In a possible implementation, the first location includes two or more locations. The processing module 1802 is further configured to determine, based on the two or more locations, that an area in which the first location is located on the display page includes at least two rows or at least two columns.

In a possible implementation, the touch information further includes a second location, and the second location is a touch location at which the user sliding operation ends. The sliding direction includes a horizontal direction and a vertical direction, the horizontal direction is parallel to a first edge of the touchscreen, the vertical direction is parallel to a second edge of the touchscreen, and the first edge is perpendicular to the second edge. The processing module 1802 is further configured to determine a sliding distance $\ell$ of the user sliding operation based on the first location and the second location, where $\ell$ is a projection distance of a straight-line distance between the second location and the first location in the sliding direction, and when the sliding direction or a pressing force direction of the first location is the vertical direction, determine the related column of the icon on which the first location is located, and when $\ell$ of the user sliding operation is greater than a minimum sliding distance $\Delta \ell$, move the column icons in the related column on the display page, or when the sliding direction or the pressing force direction of the first location is the horizontal direction, determine the related row of the icon on which the first location is located, and when $\ell$ of the user sliding operation is greater than $\Delta \ell$, move the row icons in the related row on the display page.

In a possible implementation, the processing module 1802 is further configured to cyclically move the column icons in the related column.

In a possible implementation, the processing module 1802 is further configured to move the row icons in the related row on the display page by Y icon distances, where Y is a quantity of icons in a $\ell$ distance range, and Y is an integer distance.

In a possible implementation, the processing module 1802 is further configured to remove icons that fall outside the display page after the movement, determine, from an adjacent page in a direction opposite to the sliding direction, Y icons that are located in a same row as the related row and that are adjacent to the display page, and move the icons to the related row on the display page.

In a possible implementation, the processing module 1802 is further configured to, when there are icons in the same row as the related row on the adjacent page and a quantity of icons is less than Y, determine a quantity P of icons in the same row as the related row on the adjacent page, where P is a positive integer, and 0<P<Y, and move all the icons in the related row on the display page by the P icons along the horizontal direction, remove icons that fall outside the display page after the movement, and move the P icons in the same row as the related row on the adjacent page to the related row on the display page.

In a possible implementation, the processing module 1802 is further configured to, when there is no icon in the same row as the related row on the adjacent page, cancel the user sliding operation.

A person skilled in the art should know that, in the user sliding operation in this disclosure, a touch point is always on the screen and does not leave the screen in an operation process. When the touch point leaves the screen, it is considered that the user sliding operation ends.

This disclosure discloses a screen icon operating method and apparatus, to determine, by using collected touch information, whether a current user sliding operation is an entire screen operation or a row/column icon operation. For the entire screen operation, a conventional operation may be excluded based on a sliding speed, and entire-screen icon movement is performed based on the touch information. For the row/column icon operation, a conventional operation may be excluded based on pressing duration, and row or column icon movement may be performed in a sliding direction. In the foregoing manner, a corresponding icon can be quickly found. In addition, when an input device is a finger, for a large-screen terminal device whose size exceeds a specific size, operations can be quickly implemented with one hand. Therefore, the operations are simpler and more convenient, and user operation experience is improved.

Figure 19:
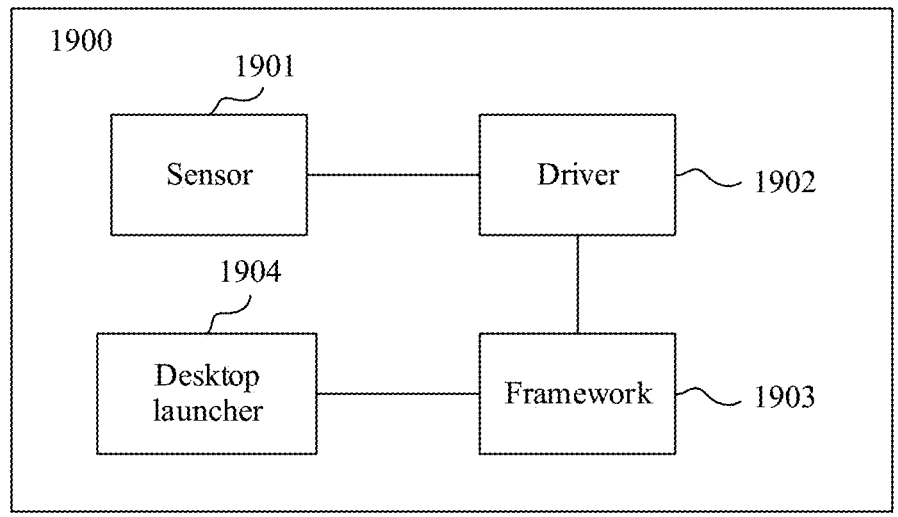
FIG. 19 is a schematic diagram of a screen icon operating apparatus according to an embodiment of this disclosure.

FIG. 19 is a schematic diagram of a screen icon operating framework according to an embodiment of this disclosure.

In FIG. 19, this disclosure further provides a screen icon operating structure 1900. The structure 1900 includes a sensor 1901, a driver 1902, a framework 1903, and a desktop launcher 1904.

In an example, the sensor 1901 is responsible for directly collecting operation information of a user sliding operation. The information collected by the sensor 1901 is original operation information, for example, operation information such as a first location, a sliding direction, and a pressing force direction.

In an example, the driver 1902 is configured to drive the sensor 1901. Driven by the driver 1902, the sensor 1901 can collect the sliding operation information. In addition, the driver 1902 is configured to perform format conversion on the original operation information collected by the sensor 1901, and transmit the original operation information to the framework 1903, to facilitate a subsequent operation.

In an example, as a message transfer medium and a platform capability provider, the framework 1903 receives, by using the driver 1902, the original operation information collected by the sensor 1901, and performs data translation on the original operation information, to obtain touch information that can be used at a software layer, for example, sliding touch information such as a first location, a second location, a sliding speed, touch pressing duration of the user sliding operation, and a sliding direction. In addition, the framework 1903 interacts with the desktop launcher 1904 to transmit the touch information to the desktop launcher 1904. In another example, the framework 1903 continuously obtains the original operation information collected by the sensor 1901.

In an example, the desktop launcher 1904 is configured to perform induction processing based on the touch information transmitted by the framework 1903, determine a type of a current operation, and form a corresponding operation instruction, so as to perform the foregoing methods in FIG. 2 to FIG. 18. Finally, corresponding logic processing is performed on a display interface of a screen, and the screen is used for display.

Figure 20:
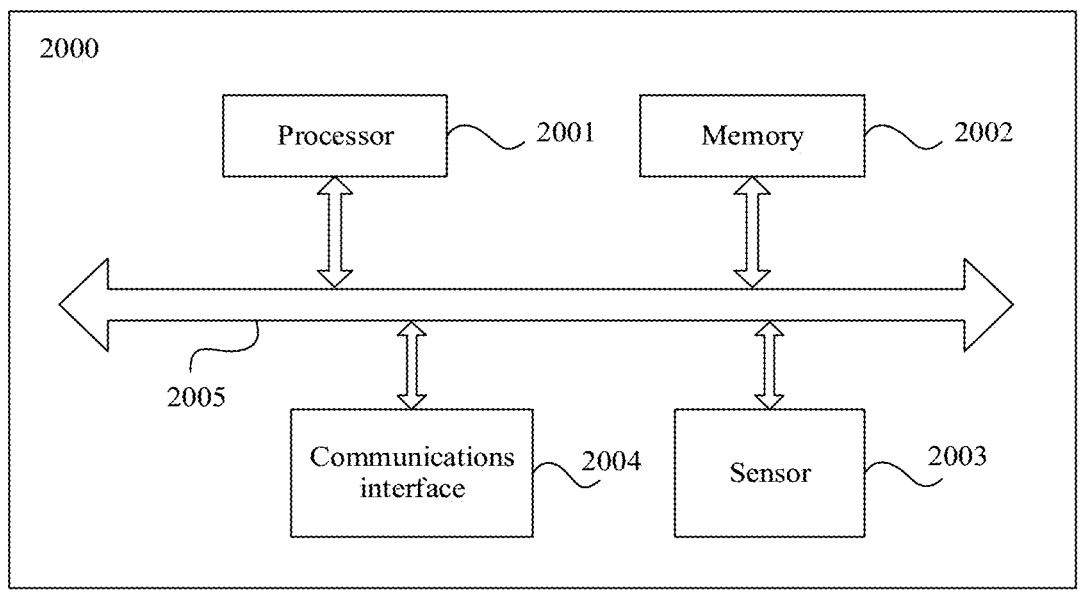
FIG. 20 is a schematic diagram of a terminal device according to an embodiment of this disclosure.

FIG. 20 is a schematic diagram of a terminal device according to an embodiment of this disclosure.

FIG. 20 provides a terminal device 2000. The device 2000 may include a processor 2001, a memory 2002, a sensor 2003, a communications interface 2004, and an interface circuit 2005. The processor 2001, the memory 2002, the sensor 2003, and the communications interface 2004 in the terminal device may establish a communications connection by using the interface circuit 2005. The communications interface 2004 is configured to send and receive external information.

The sensor 2003 is configured to collect user sliding operation information, where the user sliding operation information includes a first location, a sliding speed, pressing duration before sliding, or a sliding direction, and the first location is an initial location of a user sliding operation. In an example, the sensor 2003 may include any sensor such as a pressure sensor, a temperature sensor, or an acceleration sensor.

The memory 2002 is configured to store code instructions and the user sliding operation information collected by the sensor. In an example, the memory 2002 may include a volatile memory, for example, a random-access memory (RAM), or the memory 2002 may include a non-volatile memory, for example, a read-only memory (ROM), a flash memory, a hard disk drive (HDD), or a solid-state drive (SSD), or the memory 2002 may include a combination of the foregoing types of memories.

The interface circuit 2005 is configured to receive code instructions and transmit the code instructions to the processor.

The processor 2001 is configured to, when the first location is not located on an icon, determine that the sliding speed is less than a sliding speed threshold, and move all icons on a display page in the sliding direction, or when the first location is located on the icon, determine that the pressing duration is greater than or equal to a first duration threshold and less than or equal to a second duration threshold, and move, in the sliding direction, column icons in a related column or row icons in a related row of the icon on which the first location is located on the display page. In an example, the processor 2001 may be a central processing unit (CPU).

In a possible implementation, the touch information further includes a second location, and the second location is a touch location at which the user sliding operation ends. The processor 2001 is further configured to determine a sliding distance $\ell$ of the user sliding operation based on the first location and the second location, where $\ell$ is a projection distance of a straight-line distance between the second location and the first location in the sliding direction, and determine a supplementary parameter N, where N is determined by dividing $\ell$ by a unit switching distance $\Delta h$, $\Delta h$ is greater than or equal to a width of a single icon and less than or equal to a width of an entire screen, and $\Delta h$ is an integer multiple of the width of the single icon, and move all the icons on the display page by X rows or columns along the sliding direction, where X is a quantity of rows or columns of icons in an N×$\Delta h$ range, and X is an integer.

In a possible implementation, the sliding direction includes a horizontal direction and a vertical direction, the horizontal direction is parallel to a first edge of the touchscreen, the vertical direction is parallel to a second edge of the touchscreen, and the first edge is perpendicular to the second edge. The processor 2001 is further configured to, if the sliding direction is the horizontal direction, move all the icons on the display page by the X columns along the horizontal direction, or if the sliding direction is the vertical direction, cyclically move all the icons on the display page by the X rows along the vertical direction.

In a possible implementation, the processor 2001 is further configured to remove icons that fall outside the display page after the movement, determine, from an adjacent page in a direction opposite to the sliding direction, X columns of icons adjacent to the display page, and move the icons to the display page.

In a possible implementation, the processor 2001 is further configured to, when there are at least one column of icons on the adjacent page, and a quantity of columns of icons is less than X, determine a quantity Q of columns of icons on the adjacent page, where Q is a positive integer, and 0<Q<X, and move all the icons on the display page by Q columns along the horizontal direction, remove icons that fall outside the display page after the movement, and move the Q columns of icons on the adjacent page to the display page.

In a possible implementation, the processor 2001 is further configured to, when there is no column of icons on the adjacent page, cancel the user sliding operation.

In a possible implementation, the first location includes two or more locations. The processor 2001 is further configured to determine, based on the two or more locations, that an area in which the first location is located on the display page includes at least two rows or at least two columns.

In a possible implementation, the touch information further includes a second location, and the second location is a touch location at which the user sliding operation ends. The sliding direction includes a horizontal direction and a vertical direction, the horizontal direction is parallel to a first edge of the touchscreen, the vertical direction is parallel to a second edge of the touchscreen, and the first edge is perpendicular to the second edge. The processor 2001 is further configured to determine a sliding distance $\ell$ of the user sliding operation based on the first location and the second location, where $\ell$ is a projection distance of a straight-line distance between the second location and the first location in the sliding direction, and when the sliding direction or a pressing force direction of the first location is the vertical direction, determine the related column of the icon on which the first location is located, and when $\ell$ of the user sliding operation is greater than a minimum sliding distance $\Delta \ell$, move the column icons in the related column on the display page, or when the sliding direction or the pressing force direction of the first location is the horizontal direction, determine the related row of the icon on which the first location is located, and when $\ell$ of the user sliding operation is greater than $\Delta \ell$, move the row icons in the related row on the display page.

In a possible implementation, the processor 2001 is further configured to cyclically move the column icons in the related column.

In a possible implementation, the processor 2001 is further configured to move the row icons in the related row on the display page by Y icon distances along the horizontal direction, where Y is a quantity of icons in a $\ell$ distance range, and Y is an integer distance.

In a possible implementation, the processor 2001 is further configured to remove icons that fall outside the display page after the movement, determine, from an adjacent page in a direction opposite to the sliding direction, Y icons that are located in a same row as the related row and that are adjacent to the display page, and move the icons to the related row on the display page.

In a possible implementation, the processor 2001 is further configured to, when there are icons in the same row as the related row on the adjacent page and a quantity of icons is less than Y, determine a quantity P of icons in the same row as the related row on the adjacent page, where P is a positive integer, and 0<P<Y, and move all the icons in the related row on the display page by the P icons along the horizontal direction, remove icons that fall outside the display page after the movement, and move the P icons in the same row as the related row on the adjacent page to the related row on the display page.

In a possible implementation, the processor 2001 is further configured to, when there is no icon in the same row as the related row on the adjacent page, cancel the user sliding operation.

The screen icon operating methods provided in the embodiments in FIG. 2 to FIG. 19 are all performed by the processor 2001. File data and/or calculated data in this disclosure are/is stored in the memory 2002. In addition, the memory 2002 is further configured to store program instructions and the like that are executed by the processor to implement the screen icon operating methods provided in the embodiments in FIG. 2 to FIG. 19.

This disclosure discloses a screen icon operating method and apparatus, to determine, by using collected touch information, whether a current user sliding operation is an entire screen operation or a row/column icon operation. For the entire screen operation, a conventional operation may be excluded based on a sliding speed, and entire-screen icon movement is performed based on the touch information. For the row/column icon operation, a conventional operation may be excluded based on pressing duration, and row or column icon movement may be performed in a sliding direction. In the foregoing manner, a corresponding icon can be quickly found. In addition, when an input device is a finger, for a large-screen terminal device whose size exceeds a specific size, operations can be quickly implemented with one hand. Therefore, the operations are simpler and more convenient, and user operation experience is improved.

An ordinary person in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

Persons of ordinary skill in the art may understand that all or a part of the steps in each of the foregoing method of the embodiments may be implemented by a program instructing a processor. The foregoing program may be stored in a computer readable storage medium. The storage medium may be a non-transitory medium, such as a random-access memory, read-only memory, a flash memory, a hard disk, a solid state drive, a magnetic tape, a floppy disk, an optical disc, or any combination thereof.

The foregoing descriptions are merely preferred specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method comprising:
   collecting user sliding operation information comprising a first location, a sliding speed, and a sliding direction, wherein the first location is an initial location of a user sliding operation, wherein the sliding direction comprises a horizontal direction or a vertical direction, wherein the horizontal direction is parallel to a first edge of a touchscreen, wherein the vertical direction is parallel to a second edge of the touchscreen, and wherein the first edge is perpendicular to the second edge; and
   when the first location is not located on a first icon:
      determining that the sliding speed is less than a sliding speed threshold;
      moving all second icons on a display page by X columns along the horizontal direction when the sliding direction is the horizontal direction; and
      cyclically moving the second icons by X rows along the vertical direction when the sliding direction is the vertical direction, wherein X is an integer.

2. The method of claim 1, wherein the user sliding operation information further comprises a second location, wherein the second location is a touch location at which the user sliding operation ends, and wherein the method further comprises:
   determining, based on the first location and the second location, a sliding distance ($\ell$) of the user sliding operation, wherein $\ell$ is a projection distance of a straight-line distance between the second location and the first location in the sliding direction;
   determining a supplementary parameter (N) by dividing $\ell$ by a unit switching distance ($\Delta h$), wherein $\Delta h$ is greater than or equal to a first width of a single icon and less than or equal to a second width of an entire screen, and wherein $\Delta h$ is an integer multiple of the first width; and
   further moving the second icons by X rows or X columns along the sliding direction, wherein X is a quantity of rows or columns of icons in an N×$\Delta h$ range.

3. The method of claim 2, wherein when the sliding direction is the horizontal direction, the method further comprises:
   removing third icons that fall outside the display page after moving the second icons;
   determining, from an adjacent page in a direction opposite to the sliding direction, X columns of fourth icons adjacent to the display page; and
   moving the fourth icons to the display page.

4. The method of claim 3, wherein the sliding direction is the horizontal direction, and wherein the method further comprises:
   identifying at least one column of fifth icons on the adjacent page and a quantity of the at least one column of the fifth icons is less than X;
   determining, in response to identifying, that the quantity of the at least one column of the fifth icons is Q, wherein Q is a positive integer, and wherein 0<Q<X;
   moving the second icons by Q columns along the horizontal direction;
   removing the third icons; and
   moving the Q columns of the fifth icons to the display page.

5. The method of claim 2, wherein the sliding direction is the horizontal direction, and wherein the method further comprises canceling the sliding operation when an adjacent page in a direction opposite to the sliding direction does not comprise a column of third icons.

6. The method of claim 1, wherein the first location comprises two or more locations, and wherein the method further comprises determining, based on the two or more locations, an area that the first location is located on the display page and comprising at least two rows or at least two columns.

7. An apparatus comprising:
   a display page; and
   a processor coupled with the display page and configured to cause the apparatus to collect user sliding operation information comprising a first location located on the display page, a pressing duration before sliding, a sliding direction, and a second location, wherein the first location is an initial location of a user sliding operation, wherein the second location is a location at which the user sliding operation ends, wherein the sliding direction comprises a horizontal direction or a vertical direction, wherein the horizontal direction is parallel to a first edge of a touchscreen, wherein the vertical direction is parallel to a second edge of the touchscreen, and wherein the first edge is perpendicular to the second edge; and
   when the first location is located on a first icon, and when the pressing duration is greater than or equal to a first duration threshold and less than or equal to a second duration threshold:
      determine, based on the first location and the second location, a sliding distance ($\ell$) of the user sliding operation, wherein $\ell$ is a projection distance of a straight-line distance between the second location and the first location in the sliding direction;
      determine a related column when the sliding direction or a pressing force direction of the first location is the vertical direction and moving column icons when $\ell$ is greater than a minimum sliding distance ($\Delta\ell$);

determine a related row when the sliding direction or the pressing force direction is the horizontal direction and moving row icons when $\ell$ is greater than $\Delta\ell$; and move, in the sliding direction, column icons in a related column of the first icon or row icons in a related row of the first icon.

8. The apparatus of claim 7, wherein the processor is further configured to cause the apparatus to cyclically move the column icons.

9. The apparatus of claim 7, wherein the processor is further configured to cause the apparatus to move the row icons by Y icon distances along the horizontal direction, wherein Y is a quantity of second icons in an $\ell$ distance range, and wherein Y is an integer distance.

10. The apparatus of claim 9, wherein the processor is further configured to cause the apparatus to:
  remove third icons that fall outside the display page after moving the row icons;
  determine, from an adjacent page in a direction opposite to the sliding direction, Y icons that are located in a same row as the related row and that are adjacent to the display page; and
  move the Y icons to the related row on the display page.

11. The apparatus of claim 10, wherein the processor is further configured to cause the apparatus to:
  identify fourth icons in the same row as the related row on the adjacent page and a quantity of the fourth icons is less than Y;
  determine, in response to identifying, that the quantity of the fourth icons is P, wherein P is a positive integer, and wherein 0<P<Y;
  move the row icons by P icons along the horizontal direction;
  remove the third icons; and
  move the fourth icons to the related row on the display page.

12. The apparatus of claim 9, wherein the processor is further configured to cause the apparatus to cancel the user sliding operation when there is no icon in the same row as the related row on an adjacent page in a direction opposite to the sliding direction.

13. An apparatus comprising:
  a sensor configured to collect user sliding operation information comprising a first location on a display page, a sliding speed, a pressing duration before sliding, a sliding direction, and a second location, wherein the first location is an initial location of a user sliding operation, and wherein the second location is a location where the user sliding operation ends;
  a memory coupled to the sensor and configured to store the user sliding operation information; and
  a processor coupled to the sensor and the memory and configured to:
    when the first location is not located on a first icon, and when the sliding speed is less than a sliding speed threshold:
      determine, based on the first location and the second location, a sliding distance ($\ell$) of the user sliding operation, wherein $\ell$ is a projection distance of a straight-line distance between the second location and the first location in the sliding direction;
      determine a supplementary parameter (N) by dividing $\ell$ by a unit switching distance ($\Delta h$), wherein $\Delta h$ is greater than or equal to a first width of a single icon and less than or equal to a second width of an entire screen, and wherein $\Delta h$ is an integer multiple of the first width; and
      move second icons by X rows or X columns along the sliding direction, wherein X is a quantity of rows or columns of third icons in an N×$\Delta h$ range, and wherein X is an integer; and when the first location is located on the first icon, and when a pressing duration is greater than or equal to a first duration threshold and less than or equal to a second duration threshold:
      move, in the sliding direction, column icons in a related column of the first icon or row icons in a related row of the first icon.

14. The apparatus of claim 13, wherein the sliding direction comprises a horizontal direction and a vertical direction, wherein the horizontal direction is parallel to a first edge of a touchscreen of the apparatus, wherein the vertical direction is parallel to a second edge of the touchscreen, wherein the first edge is perpendicular to the second edge, and wherein the processor is further configured to:
  further move the second icons by the X columns along the horizontal direction when the sliding direction is the horizontal direction; and
  cyclically move the second icons by the X rows along the vertical direction when the sliding direction is the vertical direction.

15. The apparatus of claim 14, wherein the processor is further configured to:
  remove third icons that fall outside the display page after moving the second icons;
  determine, from an adjacent page in a direction opposite to the sliding direction, X columns of fourth icons adjacent to the display page; and
  move the fourth icons to the display page.

16. The apparatus according to claim 15, wherein the processor is further configured to:
  identify at least one column of fifth icons on the adjacent page and a quantity of the at least one column of the fifth icons is less than X;
  determine, in response to identifying, that the quantity of the at least one column of the fifth icons is Q, wherein Q is a positive integer, and wherein 0<Q<X;
  move the second icons by Q columns along the horizontal direction;
  remove the third icons; and
  move the Q columns of the fifth icons to the display page.

17. The apparatus of claim 14, wherein the processor is further configured to cancel the user sliding operation when an adjacent page in a direction opposite to the sliding direction does not comprise a column of third icons.

18. An apparatus comprising:
  a touchscreen;
  a processor coupled with the touchscreen and configured to cause the apparatus to:
  collect user sliding operation information comprising a first location, a sliding speed, and a sliding direction, wherein the first location is an initial location of a user sliding operation, wherein the sliding direction comprises a horizontal direction or a vertical direction, wherein the horizontal direction is parallel to a first edge of the touchscreen, wherein the vertical direction is parallel to a second edge of the touchscreen, and wherein the first edge is perpendicular to the second edge; and when the first location is not located on a first icon:
  determine that the sliding speed is less than a sliding speed threshold;
  move all second icons on a display page by X columns along the horizontal direction when the sliding direction is the horizontal direction; and
  cyclically move the second icons by X rows along the vertical direction when the sliding direction is the vertical direction, wherein X is an integer.

19. The apparatus of claim 18, wherein the user sliding operation information further comprises a second location, wherein the second location is a touch location at which the user sliding operation ends, and wherein the processor is further configured to cause the apparatus to:
  determine, based on the first location and the second location, a sliding distance ($\ell$) of the user sliding operation, wherein $\ell$ is a projection distance of a straight-line distance between the second location and the first location in the sliding direction;
  determine a supplementary parameter (N) by dividing $\ell$ by a unit switching distance ($\Delta h$), wherein $\Delta h$ is greater than or equal to a first width of a single icon and less than or equal to a second width of an entire screen, and wherein $\Delta h$ is an integer multiple of the first width; and
  further move the second icons by X rows or X columns along the sliding direction, wherein X is a quantity of rows or columns of icons in an $N \times \Delta h$ range.

20. The apparatus of claim 19, wherein when the sliding direction is the horizontal direction, the processor further causes the apparatus to:
  remove third icons that fall outside the display page after moving the second icons;
  determine, from an adjacent page in a direction opposite to the sliding direction, X columns of fourth icons adjacent to the display page; and
  move the fourth icons to the display page.

* * * * *

UNITED STATES PATENT AND TRADEMARK OFFICE
CERTIFICATE OF CORRECTION

PATENT NO. : 11,966,576 B2
APPLICATION NO. : 17/827342
DATED : April 23, 2024
INVENTOR(S) : Yuchi Ma et al.

Page 1 of 1

It is certified that error appears in the above-identified patent and that said Letters Patent is hereby corrected as shown below:

In the Claims

Claim 7, Column 33, Line 4-6: should read "the pressing force direction is the horizontal direction and moving row icons when $\ell$ is greater than $\Delta\ell$; and"

Signed and Sealed this
Third Day of September, 2024

Katherine Kelly Vidal
*Director of the United States Patent and Trademark Office*